United States Patent
Fox et al.

(10) Patent No.: US 8,372,175 B2
(45) Date of Patent: *Feb. 12, 2013

(54) PLEATED FILTER WITH BIMODAL MONOLAYER MONOCOMPONENT MEDIA

(75) Inventors: Andrew R. Fox, Oakdale, MN (US); John D. Stelter, St. Joseph Township, WI (US); Seyed A. Angadjivand, Woodbury, MN (US); Timothy J. Lindquist, Woodbury, MN (US); John M. Brandner, St. Paul, MN (US); James E. Springett, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/789,053

(22) Filed: May 27, 2010

(65) Prior Publication Data

US 2010/0229516 A1    Sep. 16, 2010

Related U.S. Application Data

(62) Division of application No. 11/461,307, filed on Jul. 31, 2006, now Pat. No. 7,754,041.

(51) Int. Cl.
*B01D 46/00* (2006.01)

(52) U.S. Cl. ............... 55/521; 55/524; 55/527; 55/528; 442/400

(58) Field of Classification Search ................ 55/385.1, 55/385.2, 385.3, 385.4, 490–519, 521, 527; 55/528; 442/327–417; 128/205.27–206.19; 210/483–510.1
See application file for complete search history.

(56) References Cited

U.S. PATENT DOCUMENTS

| | | | |
|---|---|---|---|
| 3,073,735 A | 1/1963 | Till et al. |
| 3,981,650 A | 9/1976 | Page |
| 4,100,324 A | 7/1978 | Anderson |
| 4,118,531 A | 10/1978 | Hauser |
| 4,536,361 A | 8/1985 | Torobin |
| 4,536,440 A | 8/1985 | Berg |
| 4,547,950 A | 10/1985 | Thompson |
| 4,588,537 A | 5/1986 | Klasse et al. |
| 4,714,647 A | 12/1987 | Shipp et al. |

(Continued)

FOREIGN PATENT DOCUMENTS

| CA | 2647800 | 10/2007 |
|---|---|---|
| DE | 19956368 A1 * | 6/2001 |

(Continued)

OTHER PUBLICATIONS

U.S. Appl. No. 11/457,906 Fox et al., filed Jul. 17, 2006.

(Continued)

*Primary Examiner* — Duane Smith
*Assistant Examiner* — Thomas McKenzie
(74) *Attorney, Agent, or Firm* — Kenneth B. Wood

(57) ABSTRACT

A pleated filter is made from a monocomponent monolayer nonwoven web containing a bimodal mass fraction/fiber size mixture of intermingled larger size and smaller size continuous monocomponent polymeric fibers of the same polymeric composition. Rows of pleats are formed in the nonwoven web, and the pleated web is cut to a desired size and shape to provide a filter element containing a self-supporting porous monocomponent monolayer matrix of fibers bonded to one another at least some points of fiber intersection and having an average initial submicron efficiency of at least 15% at a 1.52 meters/sec face velocity. The filter element is deformation resistant without requiring stiffening layers, bicomponent fibers or other reinforcing measures in the filter media layer.

12 Claims, 13 Drawing Sheets

U.S. PATENT DOCUMENTS

| | | | |
|---|---|---|---|
| 4,807,619 A | 2/1989 | Dyrud et al. | |
| 4,818,464 A | 4/1989 | Lau | |
| 4,883,547 A | 11/1989 | Japuntich | |
| 4,931,355 A | 6/1990 | Radwanski et al. | |
| 4,988,560 A | 1/1991 | Meyer et al. | |
| 5,227,107 A | 7/1993 | Dickenson et al. | |
| 5,240,479 A | 8/1993 | Bachinski | |
| 5,273,565 A | 12/1993 | Milligan et al. | |
| 5,374,458 A | 12/1994 | Burgio | |
| 5,382,400 A | 1/1995 | Pike et al. | |
| 5,480,466 A | 1/1996 | Jackson et al. | |
| 5,496,507 A | 3/1996 | Angadjivand et al. | |
| 5,582,907 A | 12/1996 | Pall | |
| 5,591,335 A | 1/1997 | Barboza et al. | |
| 5,597,645 A * | 1/1997 | Pike et al. | 96/99 |
| 5,641,555 A | 6/1997 | Berrigan et al. | |
| 5,679,042 A | 10/1997 | Varona | |
| 5,679,379 A | 10/1997 | Fabbricante et al. | |
| 5,685,757 A * | 11/1997 | Kirsch et al. | 442/344 |
| 5,695,376 A | 12/1997 | Datta et al. | |
| 5,707,468 A | 1/1998 | Arnold et al. | |
| 5,709,735 A | 1/1998 | Midkiff et al. | |
| 5,721,180 A | 2/1998 | Pike et al. | |
| 5,817,584 A | 10/1998 | Singer et al. | |
| 5,820,645 A | 10/1998 | Murphy, Jr. | |
| 5,873,968 A | 2/1999 | Pike et al. | |
| 5,877,098 A | 3/1999 | Tanaka et al. | |
| 5,902,540 A | 5/1999 | Kwok | |
| 5,904,298 A | 5/1999 | Kwok et al. | |
| 5,908,598 A | 6/1999 | Rousseau et al. | |
| 5,993,943 A | 11/1999 | Bodaghi et al. | |
| 6,041,782 A | 3/2000 | Angadjivand et al. | |
| 6,074,869 A * | 6/2000 | Pall et al. | 435/286.5 |
| 6,165,244 A | 12/2000 | Choi | |
| 6,176,955 B1 | 1/2001 | Haynes et al. | |
| 6,183,670 B1 | 2/2001 | Torobin et al. | |
| 6,230,901 B1 | 5/2001 | Ogata et al. | |
| 6,269,513 B1 | 8/2001 | Torobin | |
| D449,100 S | 10/2001 | Sundet et al. | |
| 6,319,865 B1 | 11/2001 | Mikami | |
| 6,397,458 B1 | 6/2002 | Jones et al. | |
| 6,398,847 B1 | 6/2002 | Jones et al. | |
| 6,409,806 B1 | 6/2002 | Jones et al. | |
| 6,485,811 B1 | 11/2002 | Horiguchi et al. | |
| 6,521,011 B1 | 2/2003 | Sundet et al. | |
| 6,548,431 B1 | 4/2003 | Bansal et al. | |
| 6,562,112 B2 | 5/2003 | Jones et al. | |
| 6,607,624 B2 | 8/2003 | Berrigan et al. | |
| 6,616,723 B2 * | 9/2003 | Berger | 55/527 |
| 6,667,254 B1 | 12/2003 | Thompson et al. | |
| 6,723,669 B1 | 4/2004 | Clark et al. | |
| 6,740,137 B2 | 5/2004 | Kubokawa et al. | |
| 6,743,273 B2 | 6/2004 | Chung et al. | |
| 6,800,226 B1 | 10/2004 | Gerking | |
| 6,827,764 B2 | 12/2004 | Springett et al. | |
| 6,858,297 B1 | 2/2005 | Shah et al. | |
| 6,916,752 B2 | 7/2005 | Berrigan et al. | |
| 6,923,182 B2 | 8/2005 | Angadjivand et al. | |
| 6,998,164 B2 | 2/2006 | Neely et al. | |
| 7,048,501 B2 * | 5/2006 | Katayama et al. | 415/121.2 |
| 7,094,270 B2 * | 8/2006 | Schultink et al. | 55/486 |
| 7,476,632 B2 * | 1/2009 | Olson et al. | 442/411 |
| 7,691,168 B2 * | 4/2010 | Fox et al. | 55/528 |
| 7,902,096 B2 * | 3/2011 | Brandner et al. | 442/400 |
| 2002/0083837 A1 * | 7/2002 | Doherty | 96/66 |
| 2003/0037675 A1 * | 2/2003 | Gillingham et al. | 95/280 |
| 2003/0089090 A1 | 5/2003 | Sundet et al. | |
| 2003/0089091 A1 | 5/2003 | Sundet et al. | |
| 2003/0134515 A1 | 7/2003 | David et al. | |
| 2003/0177909 A1 * | 9/2003 | Koslow | 96/154 |
| 2003/0196421 A1 * | 10/2003 | Berger | 55/527 |
| 2003/0205531 A1 * | 11/2003 | Koslow | 210/660 |
| 2004/0016345 A1 | 1/2004 | Springett | |
| 2004/0097155 A1 | 5/2004 | Olson et al. | |
| 2004/0116026 A1 * | 6/2004 | Kubose et al. | 442/340 |
| 2004/0141835 A1 * | 7/2004 | Katayama et al. | 415/121.2 |
| 2004/0172930 A1 * | 9/2004 | Nguyen | 55/528 |
| 2004/0211160 A1 * | 10/2004 | Rammig et al. | 55/382 |
| 2004/0255783 A1 * | 12/2004 | Graham et al. | 96/69 |
| 2005/0217226 A1 | 10/2005 | Sundet et al. | |
| 2006/0005518 A1 | 1/2006 | Duffy et al. | |
| 2006/0094320 A1 * | 5/2006 | Chen et al. | 442/340 |
| 2007/0084786 A1 * | 4/2007 | Smithies | 210/490 |
| 2008/0022643 A1 | 1/2008 | Fox | |
| 2008/0026173 A1 | 1/2008 | Angadjivand et al. | |
| 2008/0026661 A1 | 1/2008 | Fox et al. | |
| 2008/0038976 A1 | 2/2008 | Berrigan et al. | |
| 2008/0315454 A1 | 12/2008 | Angadjivand et al. | |
| 2008/0318014 A1 | 12/2008 | Angadjivand et al. | |
| 2008/0318024 A1 | 12/2008 | Angadjivand | |
| 2009/0120048 A1 * | 5/2009 | Wertz et al. | 55/521 |
| 2010/0201041 A1 | 8/2010 | Brandner | |
| 2010/0258967 A1 | 10/2010 | Fox | |
| 2011/0074060 A1 | 3/2011 | Angadjivand | |

FOREIGN PATENT DOCUMENTS

| | | |
|---|---|---|
| EP | 0 322 136 B1 | 2/1994 |
| EP | 0665315 A1 | 8/1995 |
| GB | 2 404 347 | 2/2005 |
| JP | 4370210 | 12/1992 |
| JP | 06-207359 | 7/1994 |
| JP | 813309 | 1/1996 |
| JP | 11-90135 | 4/1999 |
| JP | 2000336568 | 12/2000 |
| JP | 2001-049560 | 2/2001 |
| JP | 2002-180331 | 6/2002 |
| JP | 2002-348737 | 12/2002 |
| JP | 3753522 | 12/2005 |
| JP | 3753522 B2 * | 3/2006 |
| WO | WO 96/03194 | 2/1996 |
| WO | WO 2007-112877 | 10/2007 |

OTHER PUBLICATIONS

U.S. Appl. No. 11/457,899 Berrigan et al., filed Jul. 17, 2006.
U.S. Appl. No. 11/461,136 Brandner et al., filed Jul. 31, 2006.
Wente, Van A. "Superfine Thermoplastic Fibers" in Industrial Engineering Chemistry, vol. 48 pp. 1342 et seq. 1956.
Wente, V.A.;Boone, C.D.; and Fluharty E.L. "Manufacture of Superfine Organic Fibers" Report No. 4364 of the Naval Research Laboratories May 1954.
Davies, C.N., "The Separation of Airborne Dust and Particles", Institution of Mechanical Engineers, London, Proceedings 1B, 1952.
Supplementary Extended European Search Report, PCT/US2007/073885, mailed Nov. 4, 2011, 3 pages.

* cited by examiner

PLEATED FILTER WITH BIMODAL MONOLAYER MONOCOMPONENT MEDIA

CROSS REFERENCE TO RELATED APPLICATIONS

This application is a divisional of U.S. patent application Ser. No. 11/461,307, filed Jul. 31, 2006, now U.S. Pat. No. 7,754,041, the disclosure of which is herein incorporated by reference.

This invention relates to pleated filters.

BACKGROUND

Meltblown nonwoven fibrous webs are used for a variety of purposes including filtration (e.g., flat web and pleated filters), insulation, padding and textile substitutes. Patents or applications relating to nonwoven webs or their manufacture include U.S. Pat. No. 3,981,650 (Page), 4,100,324 (Anderson), U.S. Pat. No. 4,118,531 (Hauser), U.S. Pat. No. 4,818,464 (Lau), U.S. Pat. No. 4,931,355 (Radwanski et al.), U.S. Pat. No. 4,988,560 (Meyer et al.), U.S. Pat. No. 5,227,107 (Dickenson et al.), U.S. Pat. No. 5,273,565 (Milligan et al.), U.S. Pat. No. 5,382,400 (Pike et al. '400), U.S. Pat. No. 5,679,042 (Varona), U.S. Pat. No. 5,679,379 (Fabbricante et al.), U.S. Pat. No. 5,695,376 (Datta et al.), U.S. Pat. No. 5,707,468 (Arnold et al.), U.S. Pat. No. 5,721,180 (Pike et al. '180), U.S. Pat. No. 5,877,098 (Tanaka et al.), U.S. Pat. No. 5,902,540 (Kwok), U.S. Pat. No. 5,904,298 (Kwok et al.), U.S. Pat. No. 5,993,543 (Bodaghi et al.), U.S. Pat. No. 6,176,955 B1 (Haynes et al.), U.S. Pat. No. 6,183,670 B1 (Torobin et al.), U.S. Pat. No. 6,230,901 B1 (Ogata et al.), U.S. Pat. No. 6,319,865 B1 (Mikami), U.S. Pat. No. 6,607,624 B2 (Berrigan et al. '624), U.S. Pat. No. 6,667,254 B1 (Thompson et al.), U.S. Pat. No. 6,858,297 B1 (Shah et al.) and U.S. Pat. No. 6,916,752 B2 (Berrigan et al. '752); European Patent No. EP 0 322 136 B1 (Minnesota Mining and Manufacturing Co.); Japanese published application Nos. JP 2001-049560 (Nissan Motor Co. Ltd.), JP 2002-180331 (Chisso Corp. '331) and JP 2002-348737 (Chisso Corp. '737); and U.S. Patent Application Publication No. US2004/0097155 A1 (Olson et al.). Patents or applications relating to pleated filters include U.S. Pat. Nos. 4,547,950 (Thompson), U.S. Pat. No. 5,240,479 (Bachinski), U.S. Pat. No. 5,709,735 (Midkiff et al.), U.S. Pat. No. 5,820,645 (Murphy, Jr.), U.S. Pat. No. 6,165,244 (Choi), U.S. Pat. No. 6,521,011 B1 (Sundet et al. '011), U.S. Pat. No. 6,740,137 B2 (Kubokawa et al.) and D449,100 S (Sundet et al. '100), and U.S. Patent Application Publication Nos. US 2003/0089090 A1 (Sundet et al. '090), US 2003/0089091 A1 (Sundet et al. '091) and US2005/0217226 A1 (Sundet et al. '226).

SUMMARY OF THE INVENTION

Existing methods for manufacturing pleated filters generally involve some compromise of web or filter properties. For example, when a high efficiency filter containing electret charged fibers is desired, one approach is to form a multilayer filter which employs an electrostatically charged meltblown web as the primary filtration media. Meltblown fibers typically are either unoriented or weakly oriented molecularly, and they typically are insufficiently stiff and strong to provide by themselves a single layer filter media having both high efficiency and adequate strength. Inadequate strength may be manifested, for example, by damage during converting, or by pleat deformation or pleat collapse during use at high fluid flow conditions. One or more additional layers may be added to the filter media to protect the filter media and stiffen the overall filter construction. Additional layers which may be employed in such a multilayer filter include staple fiber webs, meltspun webs, scrims (e.g., fiberglass or chopped fiber mats) and wire mesh. Manufacturing a multilayer filter introduces additional cost and complexity to the filter product. A support layer can increase pressure drop without contributing to efficiency. Use of multiple layers can make it difficult or impractical to recycle waste or used filters.

Single-layer pleated filters products have been used in some applications. For example, residential furnace filters have been made from a single layer of ACCUAIR™ bi-component meltspun media from Kimberley Clark. ACCUAIR media is insufficiently stiff for use as a single layer pleated HVAC filter intended to be subjected to the typical flow rates or pressures that may arise in commercial or industrial applications. The above-mentioned Sundet et al. '226 application describes pleated furnace filters made from a single layer of meltblown fibers (e.g., polypropylene, polyester or nylon fibers), a majority of which were aligned at $90°\pm20°$ with respect to the pleat row direction. Fiberglass filtration media has also been employed as a single layer pleated filter, but fiberglass is uncharged, may have a high pressure drop, sheds glass fibers, and may be difficult to form into some shapes.

We have now found monocomponent, monolayer webs which can be formed into pleated filters having a useful combination of pleat formability, stiffness when pleated, low pressure drop and efficient particulate capture.

The invention provides in one aspect a process for making a pleated filter comprising:
 a) forming a monocomponent monolayer nonwoven web containing a bimodal mass fraction/fiber size mixture of intermingled larger size and smaller size continuous monocomponent polymeric fibers of the same polymeric composition, the web having a Gurley Stiffness of at least 100 mg,
 b) forming rows of pleats in the nonwoven web, and
 c) cutting the pleated web to a desired size and shape to form a pleated filter element comprising a self-supporting porous monocomponent monolayer matrix of fibers bonded to one another at least some points of fiber intersection and having an average initial submicron efficiency of at least 15% at a 1.52 meters/sec face velocity.

The invention provides in another aspect a pleated filter comprising a self-supporting porous monocomponent monolayer matrix containing a bimodal mass fraction/fiber size mixture of intermingled larger size and smaller size continuous monocomponent polymeric fibers of the same polymeric composition, the fibers being bonded to one another at least some points of fiber intersection and the matrix forming rows of folded or corrugated pleats and having an average initial submicron efficiency of at least 15% at a 1.52 meters/sec face velocity.

The disclosed pleated filters have a number of beneficial and unique properties. For example, a finished pleated filter may be prepared consisting only of a single layer, but comprising a mixture of larger and smaller size fibers, with broadened filtration capability and increased fiber surface area. Such pleated filters offer important efficiencies—product complexity and waste are reduced by eliminating laminating processes and equipment and by reducing the number of intermediate materials. By using direct-web-formation manufacturing equipment, in which a fiber-forming polymeric material is converted into a web in one essentially direct operation, the disclosed webs and matrices can be quite economically prepared. Also, if the matrix fibers all have the same polymeric composition and extraneous bonding materials are not employed, the matrix can be fully recycled.

By including microfibers of very small size in some of the disclosed embodiments, the disclosed webs and matrices are given an increased fiber surface area, with such beneficial effects as improved filtration performance. By using larger and smaller size fibers, filtration and pleating properties can be tailored to a particular use. And in contrast to the high pressure drop often characteristic of microfiber webs, pressure drops of the disclosed microfiber-containing web embodiments and matrices are kept lower, because the larger fibers physically separate and space apart the microfibers.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various figures of the drawing indicate like elements. The elements in the drawing are not to scale.

DETAILED DESCRIPTION

Figure 1:
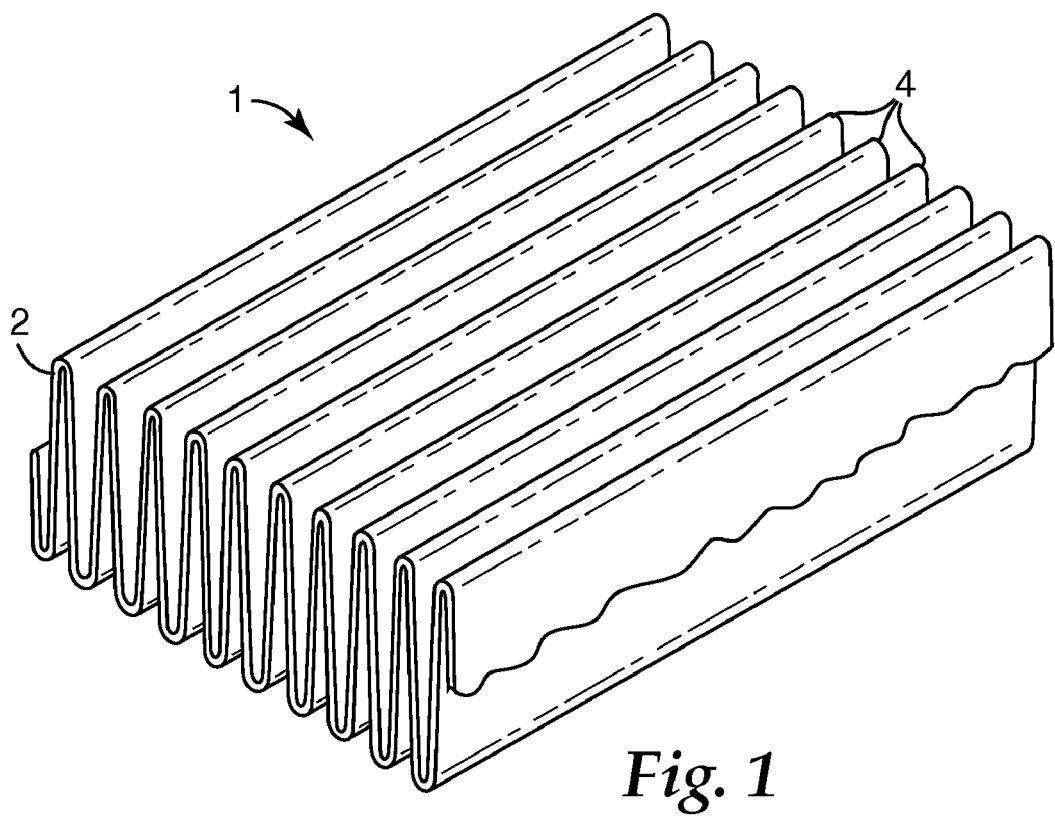
FIG. 1 is a perspective view of pleated filtration media.

The term "porous" means air-permeable.

The term "monocomponent" when used with respect to a fiber or collection of fibers means fibers having essentially the same composition across their cross-section; monocomponent includes blends (viz., polymer alloys) or additive-containing materials, in which a continuous phase of uniform composition extends across the cross-section and over the length of the fiber.

The term "of the same polymeric composition" means polymers that have essentially the same repeating molecular unit, but which may differ in molecular weight, melt index, unit of manufacture, commercial form, etc.

The term "size" when used with respect to a fiber means the fiber diameter for a fiber having a circular cross section, or the length of the longest cross-sectional chord that may be constructed across a fiber having a non-circular cross-section.

The term "continuous" when used with respect to a fiber or collection of fibers means fibers having an essentially infinite aspect ratio (viz., a ratio of length to size of e.g., at least about 10,000 or more).

The term "Effective Fiber Diameter" when used with respect to a collection of fibers means the value determined according to the method set forth in Davies, C. N., "The Separation of Airborne Dust and Particles", Institution of Mechanical Engineers, London, Proceedings 1B, 1952 for a web of fibers of any cross-sectional shape be it circular or non-circular.

The term "mode" when used with respect to a histogram of mass fraction vs. fiber size in µm or a histogram of fiber count (frequency) vs. fiber size in µm means a local peak whose height is larger than that for fiber sizes 1 and 2 µm smaller and 1 and 2 µm larger than the local peak.

The term "bimodal mass fraction/fiber size mixture" means a collection of fibers having a histogram of mass fraction vs. fiber size in µm exhibiting at least two modes. A bimodal mass fraction/fiber size mixture may include more than two modes, for example it may be a trimodal or higher-modal mass fraction/fiber size mixture.

The term "bimodal fiber count/fiber size mixture" means a collection of fibers having a histogram of fiber count (frequency) vs. fiber size in µm exhibiting at least two modes whose corresponding fiber sizes differ by at least 50% of the smaller fiber size. A bimodal fiber count/fiber size mixture may include more than two modes, for example it may be a trimodal or higher-modal fiber count/fiber size mixture.

The term "bonding" when used with respect to a fiber or collection of fibers means adhering together firmly; bonded fibers generally do not separate when a web is subjected to normal handling.

The term "nonwoven web" means a fibrous web characterized by entanglement or point bonding of the fibers.

The term "monolayer matrix" when used with respect to a nonwoven web containing a bimodal mass fraction/fiber size mixture of fibers means having (other than with respect to fiber size) a generally uniform distribution of similar fibers throughout a cross-section of the web, and having (with respect to fiber size) fibers representing each modal population present throughout a cross-section of the web. Such a monolayer matrix may have a generally uniform distribution of fiber sizes throughout a cross-section of the web or may, for example, have a depth gradient of fiber sizes such as a preponderance of larger size fibers proximate one major face of the web and a preponderance of smaller size fibers proximate the other major face of the web.

The term "attenuating the filaments into fibers" means the conversion of a segment of a filament into a segment of greater length and smaller size.

The term "meltspun" when used with respect to a nonwoven web means a web formed by extruding a low viscosity melt through a plurality of orifices to form filaments, quenching the filaments with air or other fluid to solidify at least the surfaces of the filaments, contacting the at least partially solidified filaments with air or other fluid to attenuate the filaments into fibers and collecting a layer of the attenuated fibers.

The term "meltspun fibers" means fibers issuing from a die and traveling through a processing station in which the fibers are permanently drawn and polymer molecules within the fibers are permanently oriented into alignment with the longitudinal axis of the fibers. Such fibers are essentially continuous and are entangled sufficiently that it is usually not possible to remove one complete meltspun fiber from a mass of such fibers.

The term "oriented" when used with respect to a polymeric fiber or collection of such fibers means that at least portions of the polymeric molecules of the fibers are aligned lengthwise of the fibers as a result of passage of the fibers through equipment such as an attenuation chamber or mechanical drawing machine. The presence of orientation in fibers can be detected by various means including birefringence measurements and wide-angle x-ray diffraction.

The term "Nominal Melting Point" means the peak maximum of a second-heat, total-heat-flow differential scanning calorimetry (DSC) plot in the melting region of a polymer if there is only one maximum in that region; and, if there is more than one maximum indicating more than one melting point (e.g., because of the presence of two distinct crystalline phases), as the temperature at which the highest-amplitude melting peak occurs.

The term "meltblown" when used with respect to a nonwoven web means a web formed by extruding a fiber-forming material through a plurality of orifices to form filaments while contacting the filaments with air or other attenuating fluid to attenuate the filaments into fibers and thereafter collecting a layer of the attenuated fibers.

The term "meltblown fibers" means fibers prepared by extruding molten fiber-forming material through orifices in a die into a high-velocity gaseous stream, where the extruded material is first attenuated and then solidifies as a mass of fibers. Although meltblown fibers have sometimes been reported to be discontinuous, the fibers generally are long and entangled sufficiently that it is usually not possible to remove one complete meltblown fiber from a mass of such fibers or to trace one meltblown fiber from beginning to end.

The term "microfibers" means fibers having a median size (as determined using microscopy) of 10 μm or less; "ultrafine microfibers" means microfibers having a median size of two μm or less; and "submicron microfibers" means microfibers having a median size one μm or less. When reference is made herein to a batch, group, array, etc. of a particular kind of microfiber, e.g., "an array of submicron microfibers," it means the complete population of microfibers in that array, or the complete population of a single batch of microfibers, and not only that portion of the array or batch that is of submicron dimensions.

The term "separately prepared smaller size fibers" means a stream of smaller size fibers produced from a fiber-forming apparatus (e.g., a die) positioned such that the stream is initially spatially separate (e.g., over a distance of about 1 inch (25 mm) or more from, but will merge in flight and disperse into, a stream of larger size fibers.

The term "charged" when used with respect to a collection of fibers means fibers that exhibit at least a 50% loss in Quality Factor QF (discussed below) after being exposed to a 20 Gray absorbed dose of 1 mm beryllium-filtered 80 KVp X-rays when evaluated for percent dioctyl phthalate (% DOP) penetration at a face velocity of 7 cm/sec.

The term "self-supporting" when used with respect to a monolayer matrix means that the matrix does not include a contiguous reinforcing layer of wire, mesh, or other stiffening material even if a pleated filter element containing such matrix may include tip stabilization (e.g., a planar wire face layer) or perimeter reinforcement (e.g., an edge adhesive or a filter frame) to strengthen selected portions of the filter element.

FIG. 1 shows in perspective view an exemplary pleated filter 1 made from the disclosed monocomponent monolayer web 2 which has been formed into rows of spaced pleats 4. Persons having ordinary skill in the art will appreciate that filter 1 may be used as is or that selected portions of filter 1 may be stabilized or reinforced (e.g., with a planar expanded metal face layer, reinforcing lines of hot-melt adhesive, adhesively-bonded reinforcing bars or other selective reinforcing support) and optionally mounted in a suitable frame (e.g., a metal or cardboard frame) to provide a replaceable filter for use in e.g., HVAC systems. Pleated web 2 forms a porous monolayer matrix which taken by itself has enhanced stiffness that assists in forming the pleats 4, and after pleating assists the pleats 4 in resisting deformation at high filter face velocities. Aside from the monocomponent monolayer web 2, further details regarding the construction of filter 1 will be familiar to those skilled in the art.

The disclosed monocomponent monolayer web has a Gurley Stiffness before pleating of at least about 100 mg, and may have a Gurley Stiffness before pleating of at least about 200 mg, at least about 300 mg, at least about 400 mg, at least about 600 mg or at least about 1000 mg. When evaluated at a 13.8 cm/sec face velocity and using a DOP challenge, the flat web preferably has an initial filtration quality factor QF of at least about 0.3, and more preferably at least about 0.4. After pleating, the disclosed monocomponent monolayer matrix has an average initial sub-micron efficiency of at least about 15% at a 1.52 meters/sec (300 ft/min) face velocity, and may have an average initial sub-micron efficiency of at least about 25% or at least about 50%. The pleated filter preferably has a pressure drop less than 20 mm $H_2O$ and more preferably less than 10 mm $H_2O$; and preferably has a % DOP penetration less than about 5%, and more preferably less than about 1%.

The disclosed monocomponent monolayer web contains a bimodal mass fraction/fiber size mixture of larger size and smaller size fibers. The larger size fibers may for example have a size range of about 10 to about 60 μm, about 10 to about 50 μm or about 20 to about 50 μm. The smaller size fibers may for example have a size range of about 0.1 to about 20 μm, about 0.10 to about 10 μm, about 0.1 to about 5 μm or about 0.1 to about 1 μm. A histogram of mass fraction vs. fiber size in μm may for example have a smaller size mode of about 0.1 to about 20 μm, about 0.1 to about 15 μm, about 0.1 to about 10 μm, about 0.5 to about 8 μm or about 1 to about 5 μm, and a larger size fiber mode of greater than about 10 μm (or more if the smaller size fibers have a mode more than 10 μm), about 10 to about 50 μm, about 10 to about 40 μm or about 12 to about 30 μm. The disclosed web may also have a bimodal fiber count/fiber size mixture whose histogram of fiber count (frequency) vs. fiber size in μm exhibits at least two modes whose corresponding fiber sizes differ by at least 50%, at least 100%, or at least 200% of the smaller fiber size. The smaller size fibers may also for example provide at least 20% of the fibrous surface area of the web, at least 40% or at least 60%. The web may have a variety of Effective Fiber Diameter (EFD) values, for example an EFD of about 5 to about 40 μm, or of about 6 to about 35 μm. The web may also have a variety of basis weights, for example a basis weight of about 60 to about 300 grams/m² or about 80 to about 250 grams/m².

FIG. 2 through FIG. 9 illustrate a variety of processes and equipment which may be used to make preferred monocomponent monolayer webs. The process shown in FIG. 2 through FIG. 5 combines larger size meltspun fibers from a meltspinning die and smaller size meltblown fibers from a meltblowing die. The process shown in FIG. 6 combines larger size and smaller size meltblown fibers from two meltblowing dies. The die shown in FIG. 7 produces larger size and smaller size meltspun fibers from a single meltspinning die which may be supplied with liquefied fiber-forming material from a single extruder. The die shown in FIG. 8 produces larger size and smaller size meltblown fibers from a single meltblowing die which may be supplied with liquefied fiber-forming material from a single extruder. The die shown in FIG. 9 produces larger size and smaller size meltspun fibers from a single meltspinning die which may be supplied with liquefied fiber-forming material from two extruders. The die shown in FIG. 10 and FIG. 11 produces larger size and smaller size meltblown fibers from a single meltblowing die which may be supplied with liquefied fiber-forming material from two extruders.

Figure 2:
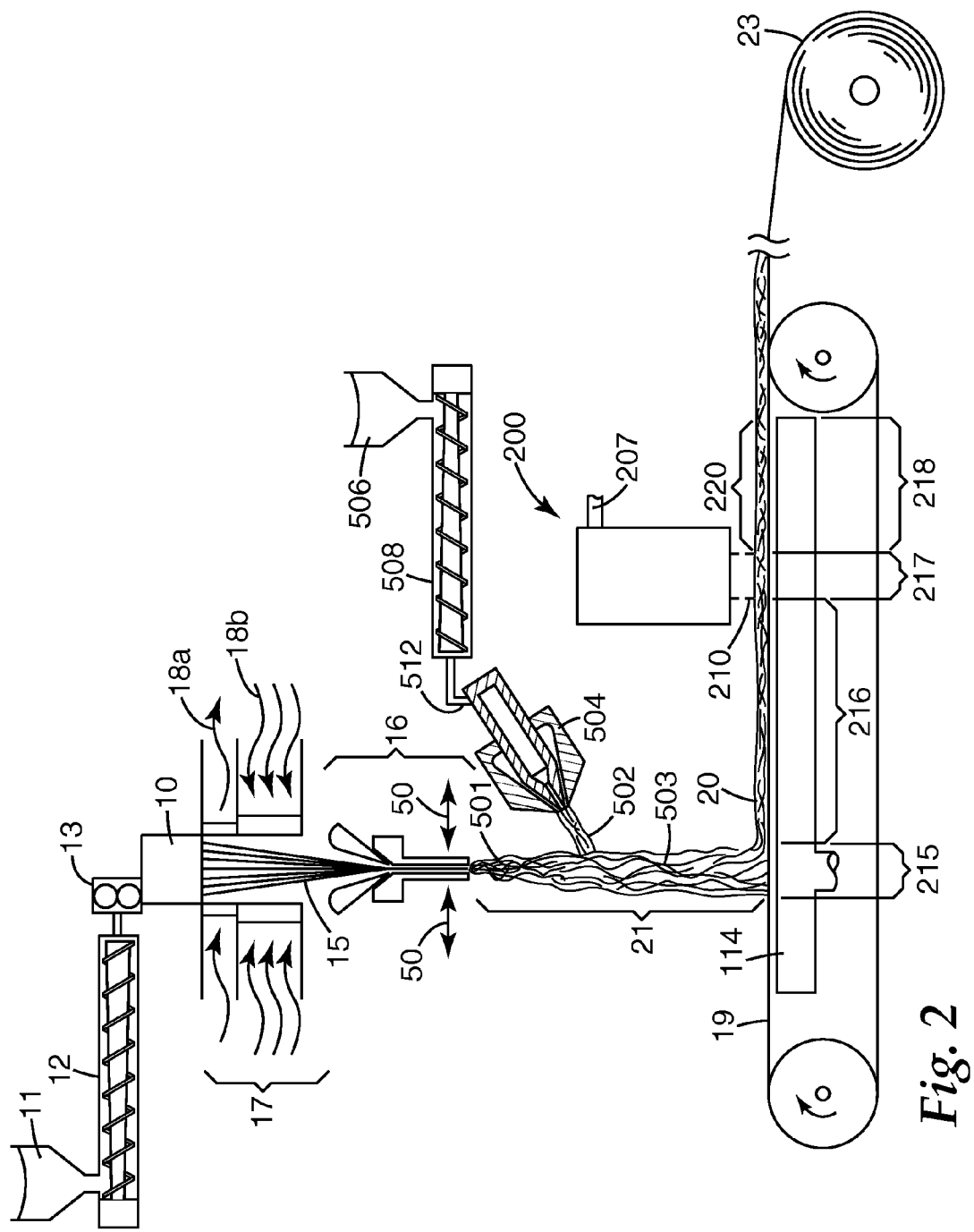
FIG. 2 through FIG. 4 are schematic side views and FIG. 5 is a schematic perspective view, partially in section, of an exemplary process for making a monocomponent monolayer web using meltspinning and separately prepared smaller size fibers of the same polymeric composition.

Referring to FIG. 2, a process is shown in schematic side view for making a pleatable monocomponent monolayer bimodal mass fraction/fiber size web using meltspinning to form larger size fibers and meltblowing to form separately prepared smaller size fibers (e.g., microfibers) of the same polymeric composition. Further details regarding this process and the nonwoven webs so made are shown in U.S. patent application Ser. No. 11/457,906, filed on Jul. 17, 2006 and entitled "FIBROUS WEB COMPRISING MICROFIBERS DISPERSED AMONG BONDED MELTSPUN FIBERS", the entire disclosure of which is incorporated herein by reference. In the apparatus shown in FIG. 2, a fiber-forming material is brought to a melt-spinning extrusion head 10—in this illustrative apparatus, by introducing a polymeric fiber-forming material into a hopper 11, melting the material in an extruder 12, and pumping the molten material into the extrusion head 10 through a pump 13. Solid polymeric material in pellet or other particulate form is most commonly used and melted to a liquid, pumpable state.

The extrusion head 10 may be a conventional spinnerette or spin pack, generally including multiple orifices arranged in a regular pattern, e.g., straight-line rows. Filaments 15 of fiber-forming liquid are extruded from extrusion head 10 and conveyed to a processing chamber or attenuator 16. The attenuator may for example be a movable-wall attenuator like that shown in U.S. Pat. No. 6,607,624 B2 (Berrigan et al.) whose walls are mounted for free and easy movement in the direction of the arrows 50. The distance 17 the extruded filaments 15 travel before reaching the attenuator 16 can vary, as can the conditions to which they are exposed. Quenching streams of air or other gas 18 may be presented to the extruded filaments to reduce the temperature of the extruded filaments 15. Alternatively, the streams of air or other gas may be heated to facilitate drawing of the fibers. There may be one or more streams of air or other fluid—e.g., a first air stream 18a blown transversely to the filament stream, which may remove undesired gaseous materials or fumes released during extrusion; and a second quenching air stream 18b that achieves a major desired temperature reduction. Even more quenching streams may be used; for example, the stream 18b could itself include more than one stream to achieve a desired level of quenching. Depending on the process being used or the form of finished product desired, the quenching air may be sufficient to solidify the extruded filaments 15 before they reach the attenuator 16. In other cases the extruded filaments are still in a softened or molten condition when they enter the attenuator. Alternatively, no quenching streams are used; in such a case ambient air or other fluid between the extrusion head 10 and the attenuator 16 may be a medium for any change in the extruded filaments before they enter the attenuator.

The continuous meltspun filaments 15 are oriented in attenuator 16 which are directed toward collector 19 as a stream 501 of larger size fibers (that is, larger in relation to the smaller size meltspun fibers that will be added to the web; the fibers in attenuated stream 501 are smaller in size than the filaments extruded from extrusion head 10). On its course between attenuator 16 and collector 19, the attenuated larger size fiber stream 501 is intercepted by a stream 502 of meltblown smaller size fibers emanating from meltblowing die 504 to form a merged bimodal mass fraction/fiber size stream 503 of larger and smaller size fibers. The merged stream becomes deposited on collector 19 as a self-supporting web 20 containing oriented continuous meltspun larger size fibers with meltblown smaller size fibers dispersed therein. The collector 19 is generally porous and a gas-withdrawal device 114 can be positioned below the collector to assist deposition of fibers onto the collector. The distance 21 between the attenuator exit and the collector may be varied to obtain different effects. Also, prior to collection, the extruded filaments or fibers may be subjected to a number of additional processing steps not illustrated in FIG. 2, e.g., further drawing, spraying, etc. After collection the collected mass 20 may be heated and quenched as described in more detail below; conveyed to other apparatus such as calendars, embossing stations, laminators, cutters and the like; or it may merely be wound without further treatment or converting into a storage roll 23.

Figure 3:
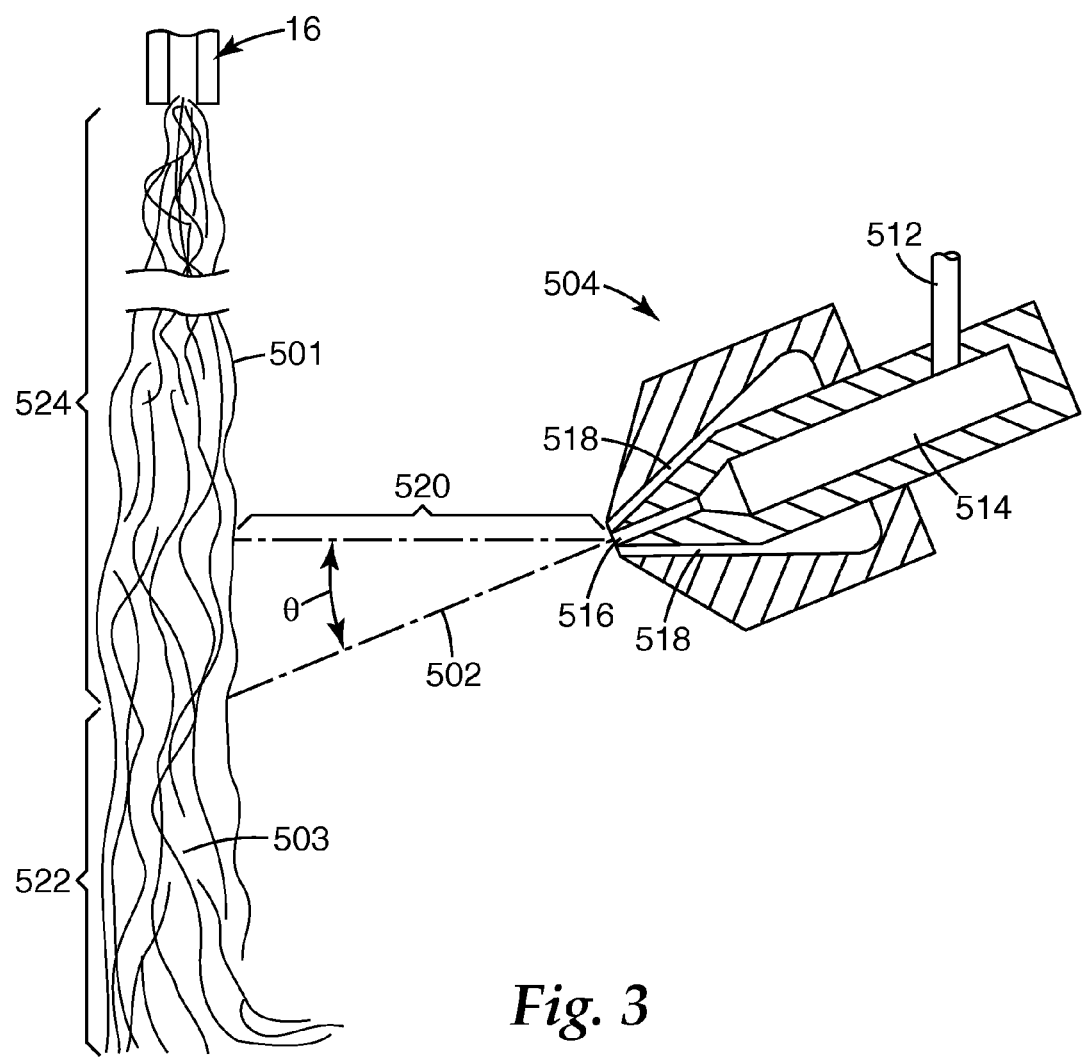

The meltblowing die 504 can be of known structure and operated in known ways to produce meltblown smaller size fibers (e.g., microfibers) for use in the disclosed process. An early description of the basic meltblowing method and apparatus is found in Wente, Van A. "Superfine Thermoplastic Fibers," in Industrial Engineering Chemistry, Vol. 48, pages 1342 et seq. (1956), or in Report No. 4364 of the Naval Research Laboratories, published May 25, 1954, entitled "Manufacture of Superfine Organic Fibers" by Wente, V. A.; Boone, C. D.; and Fluharty, E. L. The typical meltblowing apparatus includes a hopper 506 and extruder 508 supplying liquefied fiber-forming material to die 504. Referring to FIG. 3, die 504 includes an inlet 512 and die cavity 514 through which liquefied fiber-forming material is delivered to die orifices 516 arranged in line across the forward end of the die and through which the fiber-forming material is extruded; and cooperating gas orifices 518 through which a gas, typically heated air, is forced at very high velocity. The high-velocity gaseous stream draws out and attenuates the extruded fiber-forming material, whereupon the fiber-forming material solidifies (to varying degrees of solidity) and forms a stream 502 of meltblown smaller size fibers during travel to its point of merger with the meltspun larger size fiber stream 501.

Methods for meltblowing fibers of very small size including submicron sizes are known; see, for example, U.S. Pat. No. 5,993,943 (Bodaghi et al.), e.g., at column 8, line 11 through column 9, line 25. Other techniques to form smaller size fibers can also be used, for example, as described in U.S. Pat. No. 6,743,273 B2 (Chung et al.) and U.S. Pat. No. 6,800,226 B1 (Gerking).

The meltblowing die 504 is preferably positioned near the stream 501 of meltspun larger size fibers to best achieve capture of the meltblown smaller size fibers by the meltspun larger size fibers; close placement of the meltblowing die to the meltspun stream is especially important for capture of submicron microfibers. For example, as shown in FIG. 3 the distance 520 from the exit of the die 504 to the centerline of the meltspun stream 501 is preferably about 2 to 12 in. (5 to 25 cm) and more preferably about 6 or 8 in. (15 or 20 cm) or less for very small microfibers. Also, when the stream 501 of meltspun fibers is disposed vertically as shown in FIG. 3, the stream 502 of meltblown smaller size fibers is preferably disposed at an acute angle θ with respect to the horizontal, so that a vector of the meltblown stream 502 is directionally aligned with the meltspun stream 501. Preferably, θ is between about 0 and about 45 degrees and more preferably between about 10 and about 30 degrees. The distance 522 from the point of joinder of the meltblown and meltspun streams to the collector 19 is typically at least about 4 in. (10 cm) but less than about 16 in. (40 cm) to avoid over-entangling and to retain web uniformity. The distance 524 is sufficient, generally at least 6 in. (15 cm), for the momentum of the meltspun stream 501 to be reduced and thereby allow the meltblown stream 502 to better merge with the meltspun stream 501. As the streams of meltblown and meltspun fibers merge, the meltblown fibers become dispersed among the meltspun fibers. A rather uniform mixture is obtained, especially in the x-y (in-plane web) dimensions, with the distribution in the z dimension being controlled by particular process steps such as control of the distance 520, the angle θ, and the mass and velocity of the merging streams. The merged stream 503 continues to the collector 19 and there is collected as the web-like mass 20.

Depending on the condition of the meltspun and meltblown fibers, some bonding may occur between the fibers during collection. However, further bonding between the meltspun fibers in the collected web may be usually needed to provide a matrix having a desired degree of coherency and stiffness, making the web more handleable and better able to hold the meltblown fibers within the matrix. However, excessive bonding should be avoided so as to facilitate forming the web into a pleated filter.

Conventional bonding techniques using heat and pressure applied in a point-bonding process or by smooth calendar rolls can be used, though such processes may cause undesired deformation of fibers or compaction of the web. A more preferred technique for bonding the meltspun fibers is taught in U.S. patent application Ser. No. 11/457,899, filed on Jul. 17, 2006 and entitled "BONDED NONWOVEN FIBROUS WEBS COMPRISING SOFTENABLE ORIENTED SEMI-CRYSTALLINE POLYMERIC FIBERS AND APPARATUS AND METHODS FOR PREPARING SUCH WEBS", the entire disclosure of which is incorporated herein by reference. In brief summary, as applied to the present invention, this preferred technique involves subjecting a collected web of oriented semicrystalline meltspun fibers which include an amorphous-characterized phase, intermingled with meltblown fibers of the same polymeric composition, to a controlled heating and quenching operation that includes a) forcefully passing through the web a fluid heated to a temperature high enough to soften the amorphous-characterized phase of the meltspun fibers (which is generally greater than the onset melting temperature of the material of such fibers) for a time too short to melt the whole meltspun fibers (viz., causing such fibers to lose their discrete fibrous nature; preferably, the time of heating is too short to cause a significant distortion of the fiber cross-section), and b) immediately quenching the web by forcefully passing through the web a fluid having sufficient heat capacity to solidify the softened fibers (viz., to solidify the amorphous-characterized phase of the fibers softened during heat treatment). Preferably the fluids passed through the web are gaseous streams, and preferably they are air. In this context "forcefully" passing a fluid or gaseous stream through a web means that a force in addition to normal room pressure is applied to the fluid to propel the fluid through the web. In a preferred embodiment, the disclosed quenching step includes passing the web on a conveyor through a device we term a quenched flow heater, or, more simply, quenched heater. As illustrated herein, such a quenched flow heater provides a focused or knife-like heated gaseous (typically air) stream issuing from the heater under pressure and engaging one side of the web, with a gas-withdrawal device on the other side of the web to assist in drawing the heated gas through the web; generally the heated stream extends across the width of the web. The heated stream is much like the heated stream from a conventional "through-air bonder" or "hot-air knife," but it is subjected to special controls that modulate the flow, causing the heated gas to be distributed uniformly and at a controlled rate through the width of the web to thoroughly, uniformly and rapidly heat and soften the meltspun fibers to a usefully high temperature. Forceful quenching immediately follows the heating to rapidly freeze the fibers in a purified morphological form ("immediately" means as part of the same operation, i.e., without an intervening time of storage as occurs when a web is wound into a roll before the next processing step). In a preferred embodiment the gas-withdrawal device is positioned downweb from the heated gaseous stream so as to draw a cooling gas or other fluid, e.g., ambient air, through the web promptly after it has been heated and thereby rapidly quench the fibers. The length of heating is controlled, e.g., by the length of the heating region along the path of web travel and by the speed at which the web is moved through the heating region to the cooling region, to cause the intended melting/softening of the amorphous-characterizing phase without melting whole meltspun fiber.

Figure 4:
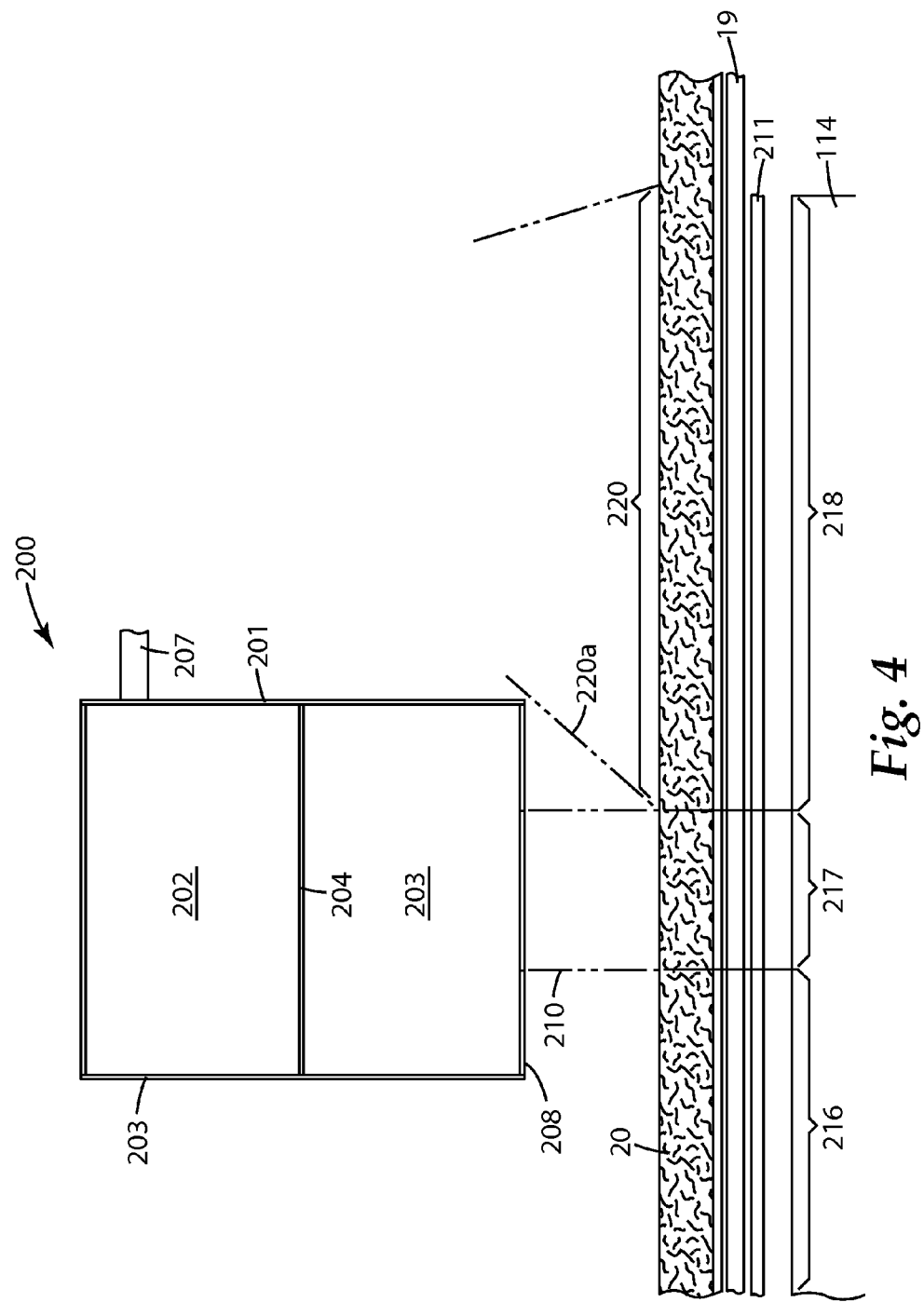
Figure 5:
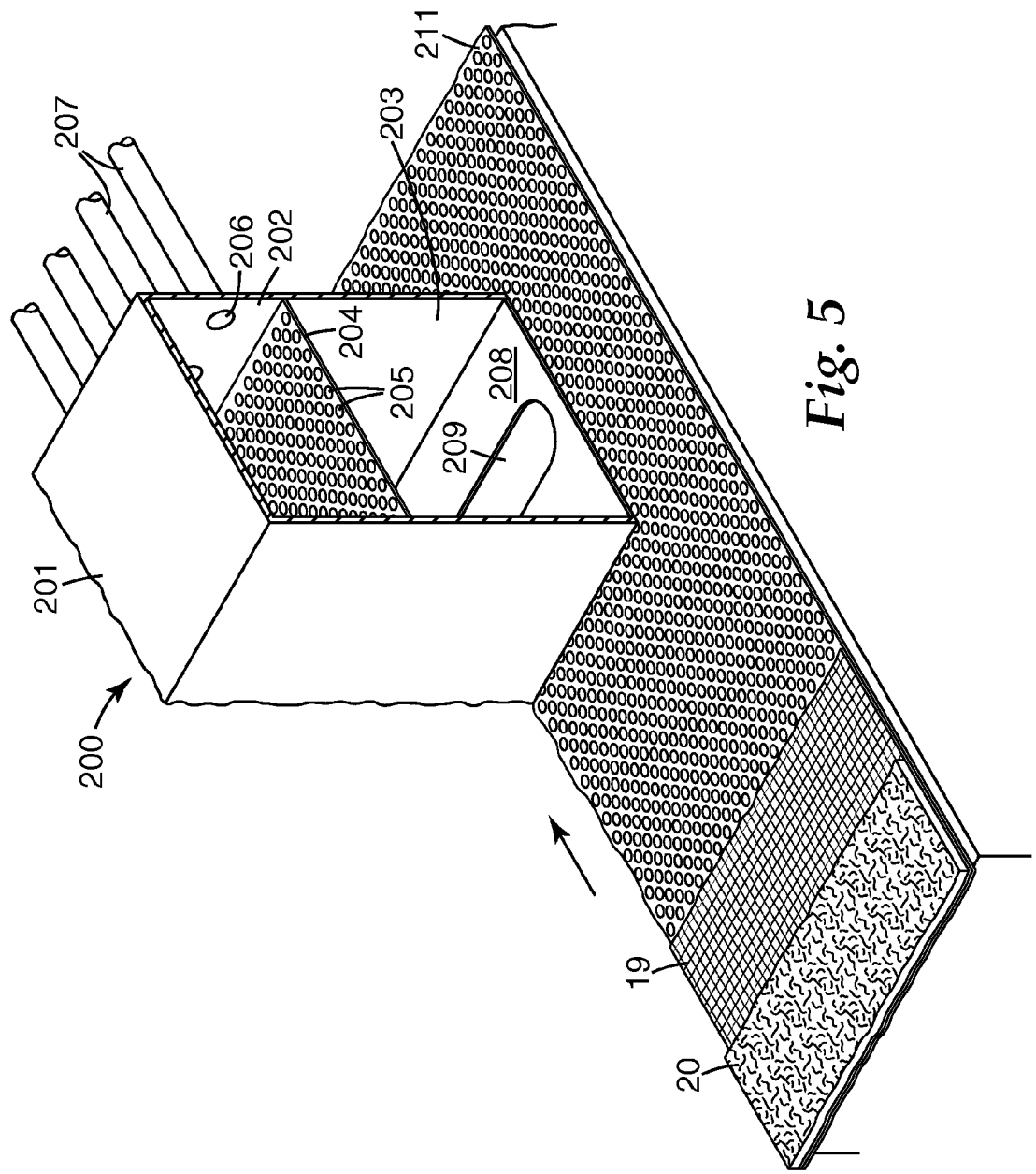

Referring to FIG. 2, FIG. 4 and FIG. 5, in one exemplary method for carrying out the quenched flow heating technique, the mass 20 of collected meltspun and meltblown fibers is carried by the moving collector 19 under a controlled-heating device 200 mounted above the collector 19. The exemplary heating device 200 comprises a housing 201 which is divided into an upper plenum 202 and a lower plenum 203. The upper and lower plenums are separated by a plate 204 perforated with a series of holes 205 that are typically uniform in size and spacing. A gas, typically air, is fed into the upper plenum 202 through openings 206 from conduits 207, and the plate 204 functions as a flow-distribution means to cause air fed into the upper plenum to be rather uniformly distributed when passed through the plate into the lower plenum 203. Other useful flow-distribution means include fins, baffles, manifolds, air dams, screens or sintered plates, viz., devices that even the distribution of air.

In the illustrative heating device 200 the bottom wall 208 of the lower plenum 203 is formed with an elongated slot 209 through which an elongated or knife-like stream 210 of heated air from the lower plenum is blown onto the mass 20 traveling on the collector 19 below the heating device 200 (the mass 20 and collector 19 are shown partly broken away in FIG. 5). The gas-withdrawal device 114 preferably extends sufficiently to lie under the slot 209 of the heating device 200 (as well as extending downweb a distance 218 beyond the heated stream 210 and through an area marked 220, as will be discussed below). Heated air in the plenum is thus under an internal pressure within the plenum 203, and at the slot 209 it is further under the exhaust vacuum of the gas-withdrawal device 114. To further control the exhaust force a perforated plate 211 may be positioned under the collector 19 to impose a kind of back pressure or flow-restriction means which assures the stream 210 of heated air will spread to a desired extent over the width or heated area of the collected mass 20 and be inhibited in streaming through possible lower-density portions of the collected mass. Other useful flow-restriction means include screens or sintered plates. The number, size and density of openings in the plate 211 may be varied in different areas to achieve desired control. Large amounts of air pass through the fiber-forming apparatus and must be disposed of as the fibers reach the collector in the region 215. Sufficient air passes through the web and collector in the region 216 to hold the web in place under the various streams of processing air. Sufficient openness is needed in the plate under the heating region 217 to allow treating air to pass through the web, while sufficient resistance is provided to assure that the air is evenly distributed. The temperature-time conditions should be controlled over the whole heated area of the mass. We have obtained best results when the temperature of the stream 210 of heated air passing through the web is within a range of 5° C., and preferably within 2 or even 1° C., across the width of the mass being treated (the temperature of the heated air is often measured for convenient control of the operation at the entry point for the heated air into the housing 201, but it also can be measured adjacent the collected web with thermocouples). In addition, the heating apparatus is operated to maintain a steady temperature in the stream over time, e.g., by rapidly cycling the heater on and off to avoid over- or under-heating. To further control heating, the mass 20 is subjected to quenching quickly after the application of the stream 210 of heated air. Such a quenching can generally be obtained by drawing ambient air over and through the mass 20 immediately after the mass leaves the controlled hot air stream 210. Numeral 220 in FIG. 4 represents an area in which ambient air is drawn through the web by the gas-withdrawal device 114 after the web has passed through the hot air stream. Actually, such air can be drawn under the base of the housing 201, e.g., in the area 220a marked on FIG. 4, so that it reaches the web almost immediately after the web leaves the hot air stream 210. And the gas-withdrawal device 114 may extend along the collector 19 for a distance 218 beyond the heating device 200 to assure thorough cooling and quenching of the whole mass 20. For shorthand purposes the combined heating and quenching apparatus is termed a quenched flow heater.

The amount and temperature of heated air passed through the mass 20 is chosen to lead to an appropriate modification of the morphology of the larger size fibers. Particularly, the amount and temperature are chosen so that the larger size fibers are heated to a) cause melting/softening of significant molecular portions within a cross-section of the fiber, e.g., the amorphous-characterized phase of the fiber, but b) will not cause complete melting of another significant phase, e.g., the crystallite-characterized phase. We use the term "melting/softening" because amorphous polymeric material typically softens rather than melts, while crystalline material, which may be present to some degree in the amorphous-characterized phase, typically melts. This can also be stated, without reference to phases, simply as heating to cause melting of lower-order crystallites within the fiber. The larger size fibers as a whole remain unmelted, e.g., the fibers generally retain the same fiber shape and dimensions as they had before treatment. Substantial portions of the crystallite-characterized phase are understood to retain their pre-existing crystal structure after the heat treatment. Crystal structure may have been added to the existing crystal structure, or in the case of highly ordered fibers crystal structure may have been removed to create distinguishable amorphous-characterized and crystallite-characterized phases.

One aim of the quenching is to withdraw heat before undesired changes occur in the smaller size fibers contained in the web. Another aim of the quenching is to rapidly remove heat from the web and the larger size fibers and thereby limit the extent and nature of crystallization or molecular ordering that will subsequently occur in the larger size fibers. By rapid quenching from the molten/softened state to a solidified state, the amorphous-characterized phase is understood to be frozen into a more purified crystalline form, with reduced lower-order molecular material that can interfere with softening, or repeatable softening, of the larger size fibers. For such purposes, desirably the mass 20 is cooled by a gas at a temperature at least 50° C. less than the Nominal Melting Point or the larger size fibers; also the quenching gas is desirably applied for a time on the order of at least one second. In any event the quenching gas or other fluid has sufficient heat capacity to rapidly solidify the fibers.

An advantage of the disclosed quenched flow heater is that the smaller size meltblown fibers held within the disclosed web are better protected against compaction than they would be if present in a layer made up entirely of smaller size fibers (e.g., entirely of microfibers). The oriented meltspun fibers are generally larger, stiffer and stronger than the meltblown smaller size fibers, and the presence of the meltspun fibers between the meltblown fibers and an object applying pressure limits application of crushing force on the smaller size meltblown fibers. Especially in the case of submicron fibers, which can be quite fragile, the increased resistance against compaction or crushing provided by the larger size fibers offers an important benefit. Even when the disclosed webs are subjected to pressure, e.g., by being rolled up in jumbo storage rolls or in secondary processing, the webs offer good resistance to compaction, which could otherwise lead to increased pressure drop and poor loading performance for filters made from such webs. The presence of the larger size meltspun fibers also adds other properties such as web strength, stiffness and handling properties.

It has been found that the meltblown smaller size fibers do not substantially melt or lose their fiber structure during the bonding operation, but remain as discrete smaller size fibers with their original fiber dimensions. Meltblown fibers have a different, less crystalline morphology than meltspun fibers, and we theorize that the limited heat applied to the web during the bonding and quenching operation is exhausted in developing crystalline growth within the meltblown fibers before melting of the meltblown fibers occurs. Whether this theory is correct or not, bonding of the meltspun fibers without substantial melting or distortion of the meltblown smaller size fibers does occur and is beneficial to the properties of the finished bimodal mass fraction/fiber size web.

Figure 6:
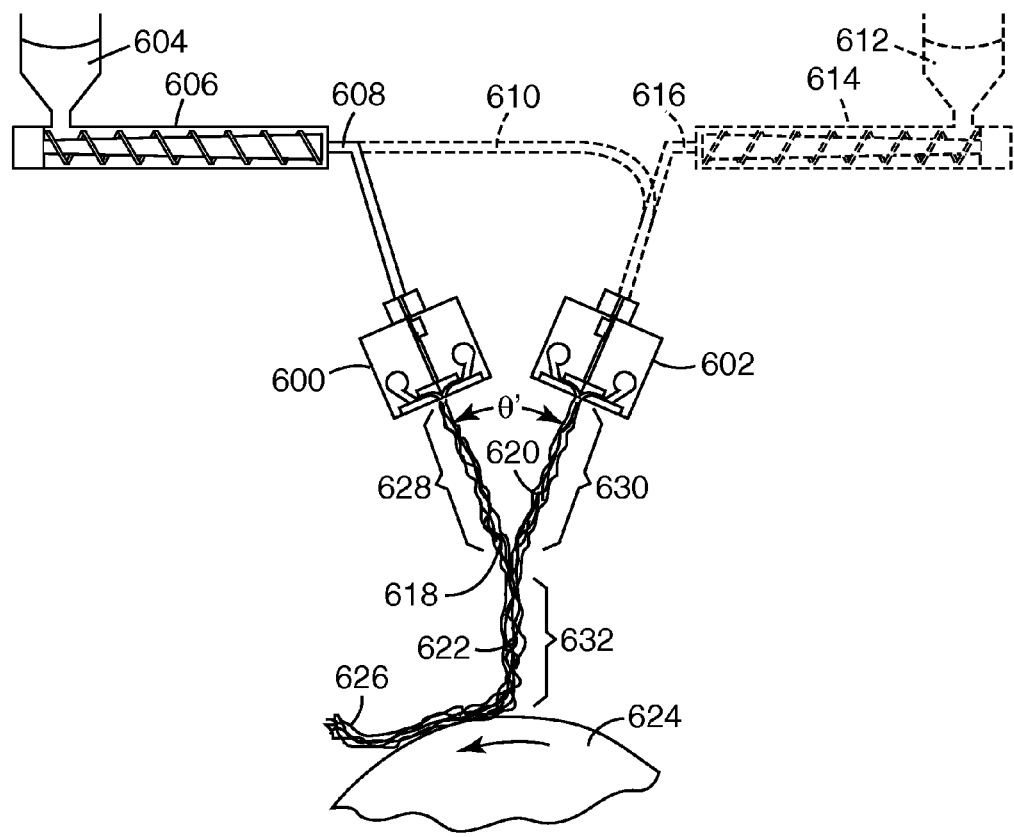
FIG. 6 is a schematic side view of an exemplary process for making a pleatable monocomponent monolayer web using meltblowing of larger fibers and separately prepared smaller size fibers of the same polymeric composition.

Referring to FIG. 6, another process is shown in schematic side view for making a pleatable monocomponent monolayer bimodal mass fraction/fiber size web using meltblowing to form both larger size fibers and separately prepared smaller size fibers of the same polymeric composition. The FIG. 6 apparatus employs two meltblowing dies 600 and 602. Die 600 is supplied with liquefied fiber-forming material fed from hopper 604, extruder 606 and conduit 608. Die 602 may also be supplied with liquefied fiber-forming material from extruder 606 via optional conduit 610. Alternatively, die 602 may be separately supplied with liquefied fiber-forming material of the same polymeric composition fed from optional hopper 612, extruder 614 and conduit 616. Larger size fiber stream 618 from die 600 and smaller size fiber stream 620 from die 602 merge in flight to provide a stream 622 of intermingled larger fibers and smaller fibers which can land on rotating collector drum 624 to provide a self-supporting nonwoven web 626 containing a bimodal mass fraction/fiber size mixture of such fibers. The apparatus shown in FIG.

6 may be operated in several modes to provide a stream of larger size fibers from one die and smaller size fibers from the other die. For example, the same polymer may be supplied from a single extruder to die 600 and die 602 with larger size orifices being provided in die 600 and smaller size orifices being provided in die 602 so as to enable production of larger size fibers at die 600 and smaller size fibers at die 602. Identical polymers may be supplied from extruder 606 to die 600 and from extruder 614 to die 602, with extruder 614 having a larger diameter or higher operating temperature than extruder 606 so as to supply the polymer at a higher flow rate or lower viscosity into die 602 and enable production of larger size fibers at die 600 and smaller size fibers at die 602. Similar size orifices may be provided in die 600 and die 602 with die 600 being operated at a low temperature and die 602 being operated at a high temperature so as to produce larger size fibers at die 600 and smaller size fibers at die 602. Polymers of the same polymeric composition but different melt indices may be supplied from extruder 606 to die 600 and from extruder 614 to die 602 (using for example a low melt index version of the polymer in extruder 606 and a high melt index of the same polymer in extruder 614) so as to produce larger size fibers at die 600 and smaller size fibers at die 602. Those having ordinary skill in the art will appreciate that other techniques (e.g., the inclusion of a solvent in the stream of liquefied fiber-forming material flowing to die 602, or the use of die cavities with a shorter flow path in die 600 and a longer flow path in die 602) and combinations of such techniques and the various operating modes discussed above may also be employed. The meltblowing dies 600 and 602 preferably are positioned so that the larger size fiber stream 618 and smaller size fiber stream 620 adequately intermingle. For example, the distance 628 from the exit of larger size fiber die 600 to the centerline of the merged fiber stream 622 is preferably about 2 to about 12 in. (about 5 to about 25 cm) and more preferably about 6 to about 8 in. (about 15 to about 20 cm). The distance 630 from the exit of smaller size fiber die 602 to the centerline of the merged fiber stream 622 preferably is about 2 to about 12 in. (about 5 to about 25 cm) and more preferably about 6 to about 8 in. (about 15 to about 20 cm) or less for very small microfibers. The distances 628 and 630 need not be the same. Also, the stream 618 of larger size fibers is preferably disposed at an acute angle θ' to the stream 620 of smaller size fibers. Preferably, θ' is between about 0 and about 45 degrees and more preferably between about 10 and about 30 degrees. The distance 632 from the approximate point of joinder of the larger and smaller size fiber streams to the collector drum 624 is typically at least about 5 in. (13 cm) but less than about 15 in. (38 cm) to avoid over-entangling and to retain web uniformity.

Figure 7:
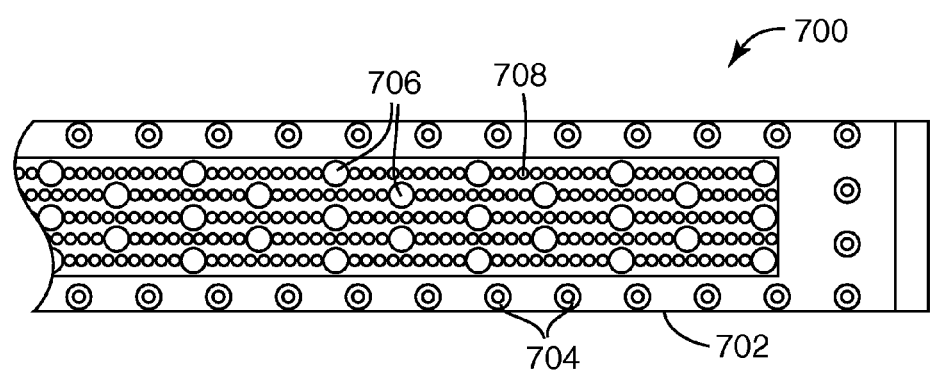
FIG. 7 is an outlet end view of an exemplary meltspinning die spinneret having a plurality of larger and smaller orifices.

Referring to FIG. 7, a meltspinning die spinneret 700 for use in making a pleatable monocomponent monolayer bimodal mass fraction/fiber size web via yet another process is shown in outlet end view. Spinneret 700 includes a body member 702 held in place with bolts 704. An array of larger orifices 706 and smaller orifices 708 define a plurality of flow passages through which liquefied fiber-forming material exits spinneret 700 and forms filaments. In the embodiment shown in FIG. 7, the larger orifices 706 and smaller orifices 708 have a 2:1 size ratio and there are 9 smaller orifices 708 for each larger orifice 706. Other ratios of larger:smaller orifice sizes may be used, for example ratios of 1.5:1 or more, 2:1 or more, 2.5:1 or more, 3:1 or more, or 3.5:1 or more. Other ratios of the number of smaller orifices per larger orifice may also be used, for example ratios of 5:1 or more, 6:1 or more, 10:1 or more, 12:1 or more, 15:1 or more, 20:1 or more or 30:1 or more. Typically there will be a direct correspondence between the number of smaller orifices per larger orifice and the number of smaller size fibers (e.g., microfibers under appropriate operating conditions) per larger size fiber in the collected web. As will be appreciated by persons having ordinary skill in the art, appropriate polymer flow rates, die operating temperatures and orienting conditions should be chosen so that smaller size fibers are produced from oriented filaments formed by the smaller orifices, larger size fibers are produced from oriented filaments formed by the larger orifices, and the completed web has the desired Gurley Stiffness. The remaining portions of the associated meltspinning apparatus will be familiar to those having ordinary skill in the art.

Figure 8:
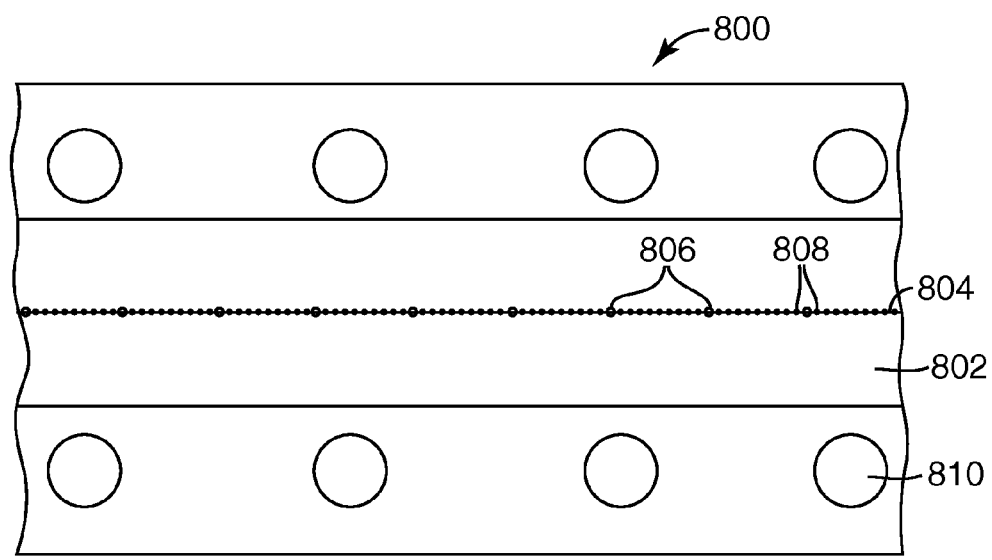
FIG. 8 is an outlet end perspective view of an exemplary meltblowing die having a plurality of larger and smaller orifices.

Referring to FIG. 8, a meltblowing die 800 for use in making a pleatable monocomponent monolayer bimodal mass fraction/fiber size web via yet another process is shown in outlet end perspective view, with the secondary attenuating gas deflector plates removed. Die 800 includes a projecting tip portion 802 with a row 804 of larger orifices 806 and smaller orifices 808 which define a plurality of flow passages through which liquefied fiber-forming material exits die 800 and forms filaments. Holes 810 receive through-bolts (not shown in FIG. 8) which hold the various parts of the die together. In the embodiment shown in FIG. 8, the larger orifices 806 and smaller orifices 808 have a 2:1 size ratio and there are 9 smaller orifices 808 for each larger orifice 806. Other ratios of larger:smaller orifice sizes may be used, for example ratios of 1:1 or more, 1.5:1 or more, 2:1 or more, 2.5:1 or more, 3:1 or more, or 3.5:1 or more. Other ratios of the number of smaller orifices per larger orifice may also be used, for example ratios of 5:1 or more, 6:1 or more, 10:1 or more, 12:1 or more, 15:1 or more, 20:1 or more or 30:1 or more. Typically there will be a direct correspondence between the number of smaller orifices per larger orifice and the number of smaller size fibers (e.g., microfibers under appropriate operating conditions) per larger size fiber in the collected web. As will be appreciated by persons having ordinary skill in the art, appropriate polymer flow rates, die operating temperatures and attenuating airflow rates should be chosen so that smaller size fibers are produced from attenuated filaments formed by the smaller orifices, larger size fibers are produced from attenuated filaments formed by the larger orifices, and the completed web has the desired Gurley Stiffness. Further details regarding the associated process and the nonwoven webs so made are shown in U.S. patent application Ser. No. 11/461,136, filed even date herewith and entitled "MONOCOMPONENT MONOLAYER MELT-BLOWN WEB AND MELTBLOWING APPARATUS", the entire disclosure of which is incorporated herein by reference.

Figure 9:
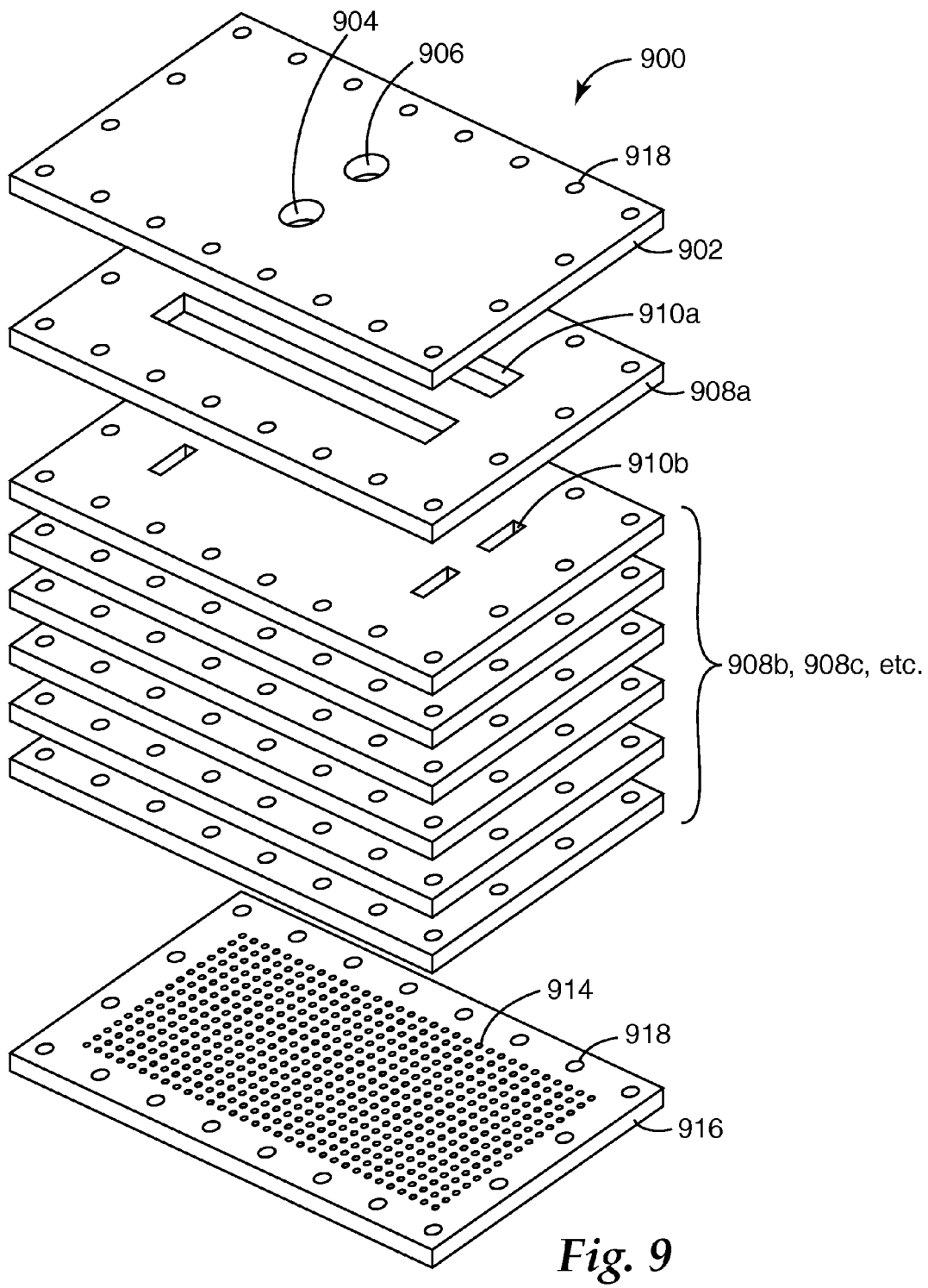
FIG. 9 is an exploded schematic view of an exemplary meltspinning die having a plurality of orifices supplied with polymers of the same polymeric composition flowing at different rates or with different viscosities.

Referring to FIG. 9, a meltspinning die 900 for use in making a pleatable monocomponent monolayer bimodal mass fraction/fiber size web via yet another process is shown in exploded schematic view. Die 900 may be referred to as a "plate die", "shim die" or "stack die", and includes an inlet plate 902 whose fluid inlets 904 and 906 each receive a stream of liquefied fiber-forming material. The streams have the same polymeric composition but different flow rates or different melt viscosities. The polymer streams flow through a series of intermediate plates 908*a*, 908*b*, etc. whose passages 910*a*, 910*b*, etc. repeatedly divide the streams. The thus serially-divided streams flow through a plurality (e.g., 256, 512 or some other multiple of the number of fluid inlets) of fluid outlet orifices 914 in outlet plate 916. The various plates may be fastened together via bolts or other fasteners (not shown in FIG. 9) through holes 918. Each fluid outlet orifice 914 will communicate via a unique flow path with one or the other of the fluid inlets 904 or 906. The remaining portions of the associated meltspinning apparatus will be familiar to those having ordinary skill in the art, and may be used to process the liquefied fiber-forming materials into a nonwoven web of meltspun filaments having a bimodal mass fraction/fiber size mixture of intermingled larger size fibers and smaller size fibers of the same polymeric composition.

Figure 10:
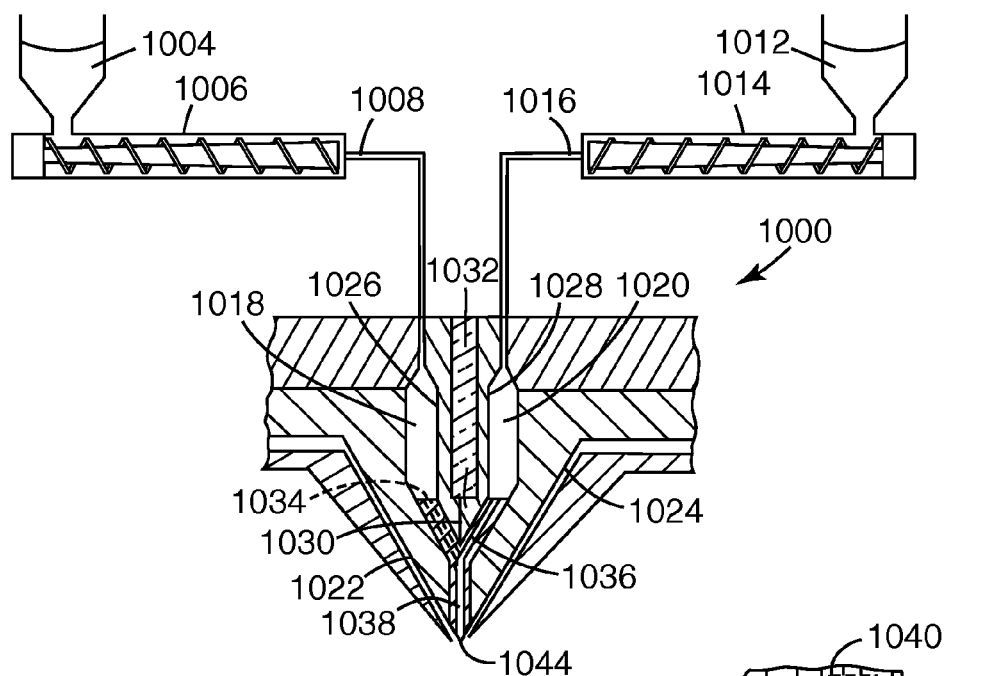
FIG. 10 is a cross-sectional view and FIG. 11 is an outlet end view of an exemplary meltblowing die having a plurality of orifices supplied with polymers of the same polymeric composition flowing at different rates or with different viscosities.
Figure 11:
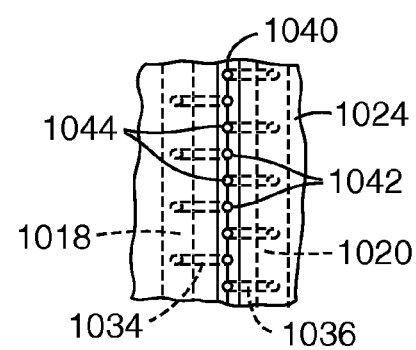

Referring to FIG. 10 and FIG. 11, meltblowing die 1000 for use in making a pleatable monocomponent monolayer bimodal mass fraction/fiber size web via yet another process is shown in cross-sectional and outlet end view. Die 1000 is supplied with liquefied fiber-forming material fed from hopper 1004, extruder 1006 and conduit 1008 at a first flow rate or first viscosity. Die 1000 is separately supplied with liquefied fiber-forming material of the same polymeric composition fed from hopper 1012, extruder 1014 and conduit 1016 at a second, different flow rate or viscosity. The conduits 1008 and 1016 are in respective fluid communication with first and second die cavities 1018 and 1020 located in first and second generally symmetrical parts 1022 and 1024 which form outer walls for die cavities 1018 and 1020. First and second generally symmetrical parts 1026 and 1028 form inner walls for die cavities 1018 and 1020 and meet at seam 1030. Parts 1026 and 1028 may be separated along most of their length by insulation 1032. As also shown in FIG. 11, die cavities 1018 and 1020 are in respective fluid communication via passages 1034, 1036 and 1038 with a row 1040 of orifices 1042 and 1044. Dependent upon the flow rates into die cavities 1018 and 1020, filaments of larger and smaller sizes may be extruded through the orifices 1042 and 1044, thereby enabling formation of a nonwoven web containing a bimodal mass fraction/fiber size mixture of intermingled larger size fibers and smaller size fibers of the same polymeric composition. The remaining portions of the associated meltblowing apparatus will be familiar to those having ordinary skill in the art, and may be used to process the liquefied fiber-forming materials into a nonwoven web of meltblown filaments having a bimodal mass fraction/fiber size mixture of intermingled larger size fibers and smaller size fibers of the same polymeric composition.

For the embodiment shown in FIG. 11, the orifices 1042 and 1044 are arranged in alternating order and are in respective fluid communication with the die cavities 1018 and 1020. As will be appreciated by persons having ordinary skill in the art, other arrangements of the orifices and other fluid communication ratios may be employed to provide nonwoven webs with altered fiber size distributions. Persons having ordinary skill in the art will also appreciate that other operating modes and techniques (e.g., like those discussed above in connection with the FIG. 6 apparatus) and combinations of such techniques and operating modes may also be employed.

The disclosed nonwoven webs may have a random fiber arrangement and generally isotropic in-plane physical properties (e.g., tensile strength), or if desired may have an aligned fiber construction (e.g., one in which the fibers are aligned in the machine direction as described in the above-mentioned Shah et al. U.S. Pat. No. 6,858,297) and anisotropic in-plane physical properties.

A variety of polymeric fiber-forming materials may be used in the disclosed process. The polymer may be essentially any thermoplastic fiber-forming material capable of providing a nonwoven web. For webs that will be charged the polymer may be essentially any thermoplastic fiber-forming material which will maintain satisfactory electret properties or charge separation. Preferred polymeric fiber-forming materials for chargeable webs are non-conductive resins having a volume resistivity of $10^{14}$ ohm-centimeters or greater at room temperature (22° C.). Preferably, the volume resistivity is about $10^{16}$ ohm-centimeters or greater. Resistivity of the polymeric fiber-forming material may be measured according to standardized test ASTM D 257-93. Polymeric fiber-forming materials for use in chargeable webs also preferably are substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. The fibers preferably are prepared from poly-4-methyl-1 pentene or polypropylene. Most preferably, the fibers are prepared from polypropylene homopolymer because of its ability to retain electric charge, particularly in moist environments.

Electric charge can be imparted to the disclosed nonwoven webs in a variety of ways. This may be carried out, for example, by contacting the web with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al., plasma treating as disclosed in U.S. Pat. No. 6,562,112 B2 to Jones et al. and U.S. Patent Application Publication No. US2003/0134515 A1 to David et al., or combinations thereof.

Additives may be added to the polymer to enhance the web's filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those skilled in the art. For example, electret charging enhancement additives are generally present in an amount less than about 5 wt. % and more typically less than about 2 wt. %.

The disclosed nonwoven webs may be formed into pleated filters using methods and components such as those described in the above-mentioned Kubokawa et al. U.S. Pat. No. 6,740, 137 B2 and the above-mentioned Sundet et al. '226 application. Pleat formation generally will be assisted by the use of heat to bond (or to further bond) the fibers to one another at least some of the points of fiber intersection. Pleat formation may be carried out or augmented using other methods and components that will be familiar to those skilled in the art. Although not required to provide a self-supporting filter element, the disclosed pleated filters may if desired include one or more additional elements or layers other than the disclosed monolayer matrix. For example, selected portions of the filter element may be stabilized or reinforced by adding tip stabilization (e.g., a planar wire face layer or lines of hot melt adhesive) or perimeter reinforcement (e.g., an edge adhesive or a filter frame). One or more additional layers (e.g., a porous layer containing sorbent particles) may be included in the filter element to capture vapors of interest.

It may be desirable to monitor flat web properties such as basis weight, web thickness, solidity, EFD, Gurley Stiffness, Taber Stiffness, % DOP penetration, initial % NaCl penetration, pressure drop or the Quality Factor QF before pleat formation. After pleat formation it may be helpful to monitor pleated web properties such as average initial submicron efficiency or pressure drop.

EFD may be determined (unless otherwise specified) using an air flow rate of 32 liters/min (corresponding to a face velocity of 5.3 cm/sec), using the method set forth in Davies, C. N., "The Separation of Airborne Dust and Particles", Institution of Mechanical Engineers, London, Proceedings 1B, 1952.

Gurley Stiffness may be determined using a Model 4171E GURLEY™ Bending Resistance Tester from Gurley Precision Instruments. Rectangular 3.8 cm×5.1 cm rectangles are die cut from the webs with the sample long side aligned with the web transverse (cross-web) direction. The samples are loaded into the Bending Resistance Tester with the sample long side in the web holding clamp. The samples are flexed in both directions, viz., with the test arm pressed against the first major sample face and then against the second major sample face, and the average of the two measurements is recorded as the stiffness in milligrams. The test is treated as a destructive test and if further measurements are needed fresh samples are employed.

Taber Stiffness may be determined using a Model 150-B TABER™ stiffness tester (commercially available from Taber Industries). Square 3.8 cm×3.8 cm sections are carefully vivisected from the webs using a sharp razor blade to prevent fiber fusion, and evaluated to determine their stiffness in the machine and transverse directions using 3 to 4 samples and a 15° sample deflection.

Percent penetration, pressure drop and the filtration Quality Factor QF may be determined using a challenge aerosol containing NaCl or DOP particles, delivered (unless otherwise indicated) at a flow rate of 85 liters/min, and evaluated using a TSI™ Model 8130 high-speed automated filter tester (commercially available from TSI Inc.). For NaCl testing, the particles may generated from a 2% NaCl solution to provide an aerosol containing particles with a diameter of about 0.075 µm at an airborne concentration of about 16-23 mg/m$^3$, and the Automated Filter Tester may be operated with both the heater and particle neutralizer on. For DOP testing, the aerosol may contain particles with a diameter of about 0.185 µm at a concentration of about 100 mg/m$^3$, and the Automated Filter Tester may be operated with both the heater and particle neutralizer off. The samples may be exposed to the maximum NaCl or DOP particle penetration at a 13.8 cm/sec face velocity for flat web samples (corresponding to an 85 liters/min flowrate) before halting the test. Calibrated photometers may be employed at the filter inlet and outlet to measure the particle concentration and the % particle penetration through the filter. An MKS pressure transducer (commercially available from MKS Instruments) may be employed to measure pressure drop (ΔP, mm H$_2$O) through the filter. The equation:

$$QF = \frac{-\ln\left(\frac{\% \text{ Particle Penetration}}{100}\right)}{\Delta P}$$

may be used to calculate QF. Parameters which may be measured or calculated for the chosen challenge aerosol include initial particle penetration, initial pressure drop, initial Quality Factor QF, maximum particle penetration, pressure drop at maximum penetration, and the milligrams of particle loading at maximum penetration (the total weight challenge to the filter up to the time of maximum penetration). The initial Quality Factor QF value usually provides a reliable indicator of overall performance, with higher initial QF values indicating better filtration performance and lower initial QF values indicating reduced filtration performance.

Average initial submicron efficiency may be determined by installing the framed filter into a test duct and subjecting the filter to potassium chloride particles which have been dried and charge-neutralized. A test face velocity of 300 ft/min (1.52 meters/sec) may be employed. An optical particle counter may be used to measure the concentration of particles upstream and downstream from the test filter over a series of twelve particle size ranges or channels. The particle size ranges in each channel are taken from ASHRAE standard 52.2 ("Method of Testing General Ventilation Air-Cleaning Devices for Removal Efficiency by Particle Size"). The equation:

$$\text{Capture efficiency (\%)} = \frac{\text{upstream particle count} - \text{downstream particle count}}{\text{upstream particle count}} \times 100$$

may be used to determine capture efficiency for each channel. The capture efficiency values for each of the four submicron channels (viz., particle diameters of 0.3 to 0.4 µm, 0.4 to 0.55 µm, 0.55 to 0.7 µm and 0.7 to 1.0 µm) may be averaged to obtain a single value for "average initial sub-micron efficiency". The test velocity, efficiency and pressure drop results are usually all reported.

The invention is further illustrated in the following illustrative examples, in which all parts and percentages are by weight unless otherwise indicated.

EXAMPLE 1

Nine webs were prepared using an apparatus as shown in FIG. 2 through FIG. 5 from polypropylene meltspun fibers and polypropylene meltblown microfibers. The meltspun fibers were prepared from FINA™ 3860 polypropylene having a melt flow index of 70 from Total Petrochemicals, to which was added 0.75 wt. % of CHIMASSORB 944 hindered-amine light stabilizer from Ciba Specialty Chemicals. The extrusion head 10 had 16 rows of orifices, with 32 orifices in a row, making a total of 512 orifices. The orifices were arranged in a square pattern (meaning that orifices were in alignment transversely as well as longitudinally, and equally spaced both transversely and longitudinally) with 0.25 inch (6.4 mm) spacing. The polymer was fed to the extrusion head at 0.8 g/hole/minute, where the polymer was heated to a temperature of 235° C. (455° F.). Two quenching air streams (18b in FIG. 2; stream 18a was not employed) were supplied as an upper stream from quench boxes 16 in. (406 mm) in height at an approximate face velocity of 93 ft/min (0.47 msec) and a temperature of 45° F. (7.2° C.), and as a lower stream from quench boxes 7.75 in. (197 mm) in height at an approximate face velocity of 43 ft/min (0.22 m/sec) and ambient room temperature. A movable-wall attenuator like that shown in U.S. Pat. No. 6,607,624 B2 (Berrigan et al.) was employed, using an air knife gap (30 in Berrigan et al.) of 0.030 in. (0.76 mm), air fed to the air knife at a pressure of 14 psig (0.1 MPa), an attenuator top gap width of 0.20 in. (5 mm), an attenuator bottom gap width of 0.185 in. (4.7 mm), and 6 in. (152 mm) long attenuator sides (36 in Berrigan et al.). The distance (17 in FIG. 2) from the extrusion head 10 to the attenuator 16 was 31 in. (78.7 cm), and the distance (524 plus 522 in FIG. 3) from the attenuator 16 to the collection belt 19 was 27 in. (68.6 cm). The meltspun fiber stream was deposited on the collection belt 19 at a width of about 14 in. (about 36 cm). Collection belt 19 was made from 20-mesh stainless steel and moved at a rate of 47 ft/min (about 14.3 meters/min).

The meltblown fibers were prepared from FINA 3960 polypropylene having a melt flow index of 350 from Total area 220 was bonded with sufficient integrity to be handled by normal processes and equipment; the web could be wound by normal windup into a storage roll or could be subjected to various operations such as pleating and assembly into a filtration device such as a pleated filter panel. Upon microscopic examination the meltspun fibers were found to be bonded at fiber intersections and the meltblown fibers were found to be substantially unmelted and having limited bonding to the meltspun fibers (which could have developed at least in part during mixing of the meltspun and microfiber streams).

Other web and forming parameters are described below in Table 1A, where the abbreviations "QFH" and "BMF" respectively mean "quenched flow heater" and "meltblown microfibers".

TABLE 1A

| Run No. | QFH temp, °C. | Distance 520, cm | Distance 522, cm | Distance 524, cm | Meltspun rate, g/h/m | BMF rate, kg/m/hr | BMF mass, % |
| --- | --- | --- | --- | --- | --- | --- | --- |
| 1-1 | 155 | 20.3 | 18.0 | 50.6 | 0.80 | 17.9 | 18 |
| 1-2 | 147 | 10.2 | 21.7 | 46.9 | 0.80 | 17.9 | 18 |
| 1-3 | 147 | 20.3 | 18.0 | 50.6 | 0.80 | 17.9 | 18 |
| 1-4 | 155 | 10.2 | 21.7 | 46.9 | 0.80 | 17.9 | 18 |
| 1-5 | 147 | 20.3 | 18.0 | 50.6 | 0.80 | 8.93 | 10 |
| 1-6 | 155 | 10.2 | 21.7 | 46.9 | 0.80 | 8.93 | 10 |
| 1-7 | 147 | 10.2 | 21.7 | 46.9 | 0.80 | 8.93 | 10 |
| 1-8 | 155 | 20.3 | 18.0 | 50.6 | 0.80 | 8.93 | 10 |
| 1-9 | 151 | 15.2 | 19.9 | 48.7 | 0.80 | 13.39 | 14 |

Petrochemicals, to which was added 0.75 wt. % CHIMASSORB 944 hindered-amine light stabilizer. The polymer was fed into a drilled-orifice meltblowing die (504 in FIG. 2 and FIG. 3) having a 10-inch-wide (254 mm) nosetip, with twenty-five 0.015 in. diameter (0.38 mm) orifices per inch (one orifice per mm), at a rate of 0.5 to 1.0 pounds per hour (0.23 to 0.45 kg per hour) per inch (per 2.54 cm) of die width as shown below in Table 1A. The die temperature was 325° C. (617° F.) and the primary air stream temperature was 393° C. (740° F.). The flow of air in the primary air stream was estimated to be about 250 scfm (7.1 standard m³/min). The relationship of the meltblowing die to the spunbond fiber stream 1 was as follows: the distances 520, 522, and 524 varied as shown below in Table 1A, and the angle θ was 20°. The meltblown fiber stream was deposited on the collection belt 19 at a width of about 12 in. (about 30 cm).

The vacuum under collection belt 19 was estimated to be in the range of 6-12 in. H₂O (1.5-3 KPa). The region 215 of the plate 211 had 0.062-inch-diameter (1.6 mm) openings in a staggered spacing resulting in 23% open area; the web holddown region 216 had 0.062-inch-diameter (1.6 mm) openings in a staggered spacing resulting in 30% open area; and the heating/bonding region 217 and the quenching region 218 had 0.156-inch-diameter (4.0 mm) openings in a staggered spacing resulting in 63% open area. Air was supplied through the conduits 207 at a rate sufficient to present 500 ft.³/min (about 14.2 m³/min) of air at the slot 209, which was 1.5 in. by 22 in. (3.8 by 55.9 cm). The bottom of the plate 208 was ¾ to 1 in. (1.9-2.54 cm) from the collected web 20 on collector 19. The temperature of the air passing through the slot 209 as measured at the entry point for the heated air into the housing 201 is given in Table 1A for each web.

Essentially 100% of the meltblown fibers were captured within the meltspun stream. The microfibers were observed to be distributed throughout the full thickness of the web. As shown below in Table 1A, the webs contained about 10 to about 18% meltblown fibers. The web leaving the quenching The collected webs were hydrocharged with deionized water according to the technique taught in U.S. Pat. No. 5,496,507 (Angadjivand et al.), allowed to dry by hanging on a line overnight at ambient conditions, and then evaluated to determine initial pressure drop, initial % DOP penetration at a 13.8 cm/sec face velocity (which corresponds to an 8.28 m/min face velocity, and to an 85 liters/min flowrate for the sample size employed), Quality Factor QF and Gurley Stiffness. The charged webs were also compared to the flat web properties of a commercially available HVAC filter, namely a 2 in. (50 mm) deep pleated filter with 5 mm pleat spacing, the filter media being a three-layer laminate including a 17 gsm polypropylene spunbond coverweb, a 40 gsm electrostatically charged meltblown filter media, and a 90 gsm polyester spunbond stiffening layer. The web used to make the commercial pleated filter was tested in the flat condition before folding into a pleated form. The results are shown below in Table 1B:

TABLE 1B

| Run No. | Basis Weight, gsm | Initial Pressure Drop, mm H₂O | Initial DOP Penetration, % | Quality Factor, 1/mm H₂O | Gurley Stiffness |
| --- | --- | --- | --- | --- | --- |
| 1-1 | 103 | 3.58 | 12.58 | 0.58 | 784 |
| 1-2 | 110 | 5.00 | 4.34 | 0.63 | 369 |
| 1-3 | 104 | 4.28 | 6.72 | 0.63 | 387 |
| 1-4 | 97 | 4.56 | 7.36 | 0.57 | 862 |
| 1-5 | 103 | 2.56 | 14.50 | 0.75 | 392 |
| 1-6 | 96 | 2.92 | 17.40 | 0.60 | 559 |
| 1-7 | 98 | 3.40 | 9.10 | 0.70 | 414 |
| 1-8 | 93 | 2.08 | 24.14 | 0.68 | 622 |
| 1-9 | 86 | 3.44 | 10.59 | 0.65 | 432 |
| Commercial 3-layer filter media | 143 | 2.77 | 14.8 | 0.69 | Not Measured |

The web of Run No. 1-8 had the lowest pressure drop. The webs of Run Nos. 1-1 and 1-4 had somewhat higher pressure drops, but lower penetration and higher stiffness. This higher stiffness was obtained without employing an increased basis weight. The properties of the Run Nos. 1-1 through 1-8 webs show that with minor optimization the commercial 3-layer media could readily be replicated at a basis weight considerably less than the 150 gsm basis weight for the commercial 3-layer media, and that the resulting monolayer web would have good Gurley Stiffness before pleating and good deformation resistance after pleating.

Further evaluation was performed by load-testing the Run Nos. 1-1 through 1-8 webs for % NaCl penetration using a TSI 8130 Automatic Filter Tester. Particles with an approximate 0.075 μm diameter and an airborne concentration of about 16-23 mg/m$^3$ were generated from a 2% NaCl solution. The Automatic Filter Tester was run with both the heater and particle neutralizer on. Some webs were tested with the collector side of the web both up and down to examine whether fiber intermixing or the collector surface affected the loading behavior. Samples were loaded to maximum penetration at a 60 liters/min (10 cm/sec face velocity) flowrate, and the tests were then stopped. The results are shown below in Table 1C.

the meltblown fibers were found to have a median size of 0.65 μm, a mean size of 0.88 μm and a standard deviation of 0.67 μm; the maximum meltblown fiber size was 4.86 μm and the minimum meltblown fiber size was 0.20 μm. The meltspun fibers were found to have a median size of 15.8 μm, a mean size of 15.7 μm, and a standard deviation of 1.1 μm. The submicron fibers of the Run No. 1-7 web were captured with essentially 100% efficiency during the web formation process, and the resulting bonded web had adequate strength and integrity for normal handling in a pleated filter formation process.

Figure 12A:
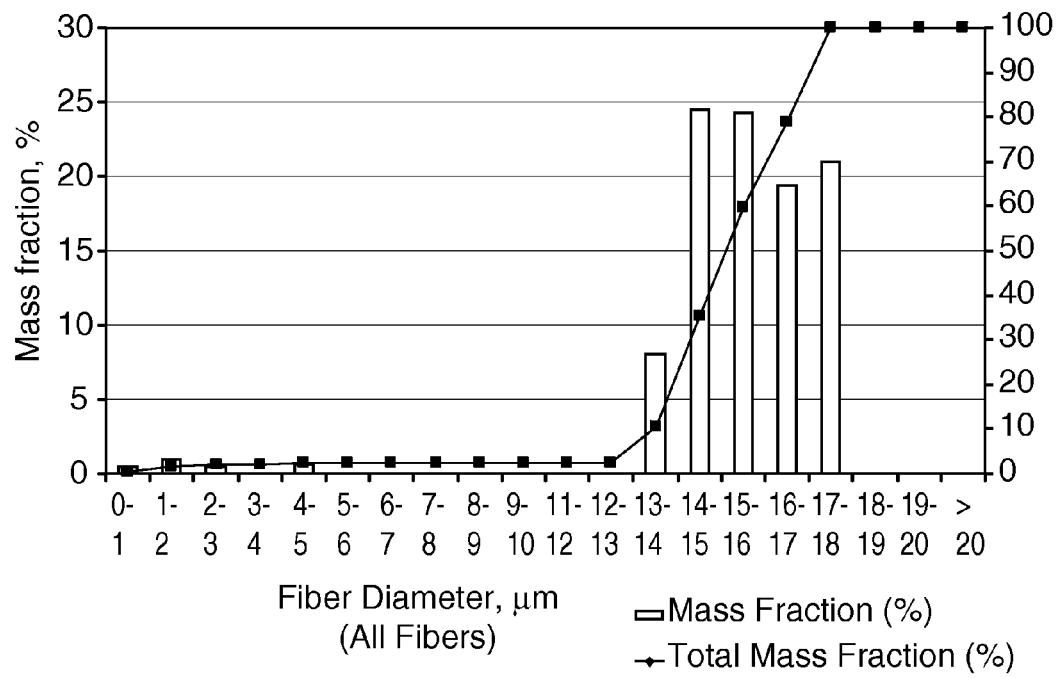
FIG. 12a and FIG. 12b are histograms of mass fraction vs. fiber size in µm.
Figure 12B:
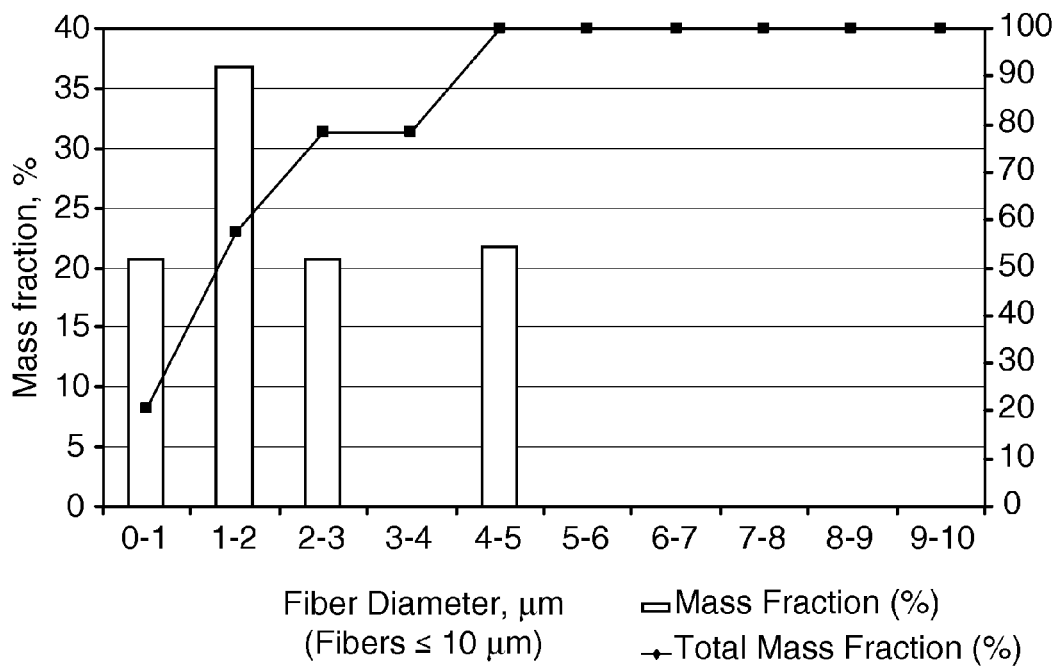

A histogram of mass fraction vs. fiber size in μm is pictured in FIG. 12a, with fiber size plotted along the abscissa and the mass fraction (percent of the total fiber mass represented by fibers of a particular size range) plotted along the ordinate. A cumulative mass fraction is plotted using a solid line. To make it easier to recognize the smaller fiber modes, a further histogram of mass fraction vs. fiber size in μm for fibers with a fiber size less than or equal to 10 μm is pictured in FIG. 12b. The web exhibited modes at 1-2, 4-5 and 14-15 μm. Based on component mass percentages and SEM measurements of the

TABLE 1C

| Web of Run No. | Collector Side | Initial Pressure Drop, mm H$_2$O at 60 liters/min | Initial NaCl Penetration, % | Initial Quality Factor QF | Maximum Pressure Drop, mm H$_2$O at 60 liters/min | Maximum NaCl Penetration, % | Challenge at max Penetration, mg |
|---|---|---|---|---|---|---|---|
| 1-1 | Down | 2.7 | 2.45 | 1.37 | 7.2 | 22.8 | 26.7 |
| 1-2 | Down | 4.4 | 0.456 | 1.23 | 11.1 | 6.49 | 28.3 |
| 1-3 | Down | 3.7 | 0.957 | 1.26 | 9.6 | 10.5 | 26.9 |
| 1-4 | Down | 3.2 | 1.32 | 1.35 | 9 | 15.6 | 62.1 |
| 1-5 | Down | 1.9 | 4.61 | 1.62 | 5.5 | 31.9 | 35.1 |
| 1-5 | Up | 2 | 3.82 | 1.63 | 7.1 | 32.7 | 35.9 |
| 1-6 | Down | 2.3 | 4.39 | 1.36 | 5.9 | 30 | 24.2 |
| 1-7 | Down | 2.8 | 1.91 | 1.41 | 7.7 | 16.2 | 29.5 |
| 1-7 | Up | 2.9 | 2.13 | 1.33 | 8.4 | 10.7 | 18.1 |
| 1-8 | Down | 1.8 | 9.38 | 1.31 | 4.5 | 45.9 | 62.4 |
| 1-9 | Down | 2.9 | 2.7 | 1.25 | 7.0 | 18.9 | 21.4 |
| Commercial 3-layer filter media | N/A | 1.9 | 9.97 | 1.21 | 4.3 | 39.9 | 22.2 |

The results in Table 1C show that the disclosed webs exhibited maximum NaCl penetration values as low as 6.49% (as the filter webs were tested, penetration gradually increased until reaching a maximum, whereupon penetration decreased because of the filtering effect of the collected challenge on the filter). The webs of Run Nos. 1-5 and 1-6 tested with the collector side down exhibited initial pressure drop values close to that of the commercial 3-layer media, but with lower initial penetration, higher initial quality factor, lower maximum penetration, and a similar pressure drop rise as a function of challenge. Compared to the commercial 3-layer media, the web of Run No. 1-8 exhibited slightly lower initial pressure drop, somewhat higher maximum penetration, and almost 3× the mass challenge at maximum penetration for a nearly equal pressure drop rise—corresponding to a better-loading filter. The webs of Run Nos. 1-5 and 1-6 tested with the collector side up and the webs of Run Nos. 1-1, 1-4, 1-7 and 1-9 tested with the collector side down exhibited moderate pressure drop, low initial penetration, moderate to high initial quality factors, and maximum penetration less than the commercial 3-layer media. In comparing Table 1B and Table 1-C, the web of Run No. 1-8 had a particularly desirable balance of flat media physical properties and filtration performance.

Figure 13:
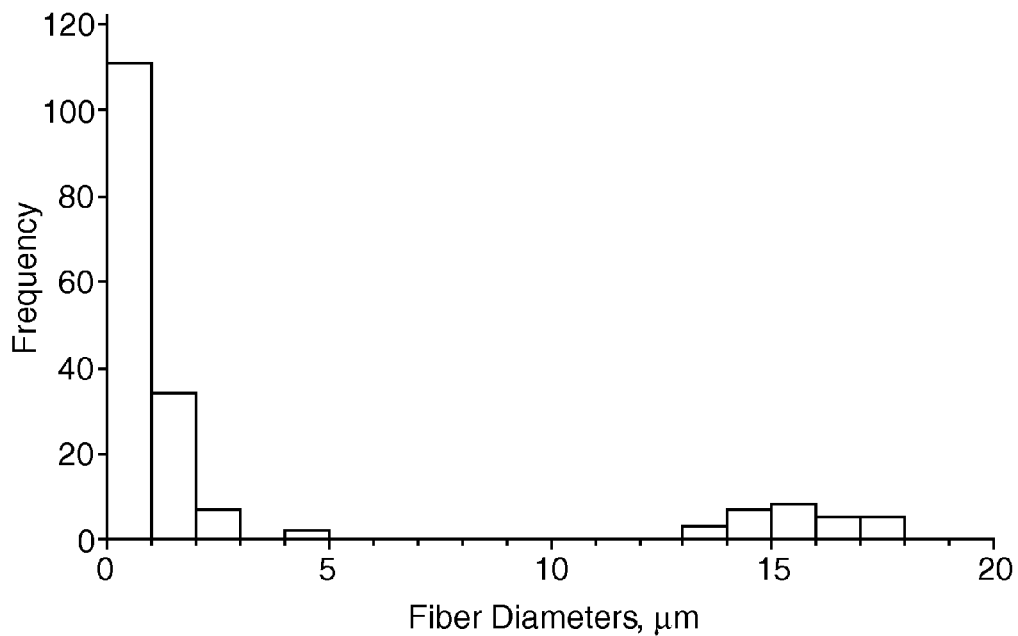
FIG. 13 is a histogram of fiber count (frequency) vs. fiber size in µm, for the web of Examples 1-7.

The web of Run No. 1-7 was submitted for analysis with a scanning electron microscope. Using a sample containing 151 meltblown fibers and 28 meltspun fibers, and assuming that all fibers less than 10 μm in size were meltblown fibers, meltblown and meltspun fiber sizes, the surface area of the meltblown microfibers was determined to represent about 51% of the total web surface area, and the surface area of the submicron fibers was determined to represent about 23% of the total web surface area. A histogram of fiber count (frequency) vs. fiber size in μm is pictured in FIG. 13, with fiber size plotted along the abscissa and frequency plotted along the ordinate.

EXAMPLE 2

The charged web of Run No. 1-8 was evaluated to determine additional flat web properties as shown below in Table 2A:

TABLE 2A

| Basis weight, gsm | 93 |
|---|---|
| Solidity, % | 11.7 |
| Thickness, mm | 0.89 |
| EFD, μm | 16 |
| Gurley Stiffness, mg | 622 |
| Pressure Drop at 13.8 cm/sec face velocity, mm H$_2$O | 2.08 |
| DOP Penetration at 13.8 cm/sec face velocity, % | 24.14 |
| Quality Factor, QF, mm$^{-1}$ H$_2$O (DOP) | 0.68 |

The web was formed into a pleated filter element with a pleat height of 20 mm and a pleat spacing of 4.6 mm. The pleats were stabilized by gluing an expanded wire screen to the pleat tips on both sides of the filter. The filter was framed with a one-piece chipboard frame having 0.5 in. (12.7 mm) flaps folded over the filter perimeter on both sides of the filter element. The open area of the filter was approximately 7.4× 12.0 in. (188×305 mm). The filter element was tested for initial pressure drop and initial fractional efficiency at a 300 ft/min (1.52 msec) face velocity. The initial pressure drop was 0.252 in. (6.4 mm) $H_2O$. The results for the individual particle size ranges are shown below in Table 2B.

TABLE 2B

| Size Range, µm | Initial Fractional Efficiency, % |
|---|---|
| 0.3-0.4 | 74.8 |
| 0.4-0.55 | 82.7 |
| 0.55-0.7 | 88.1 |
| 0.7-1.0 | 92.0 |
| 1.0-1.3 | 94.6 |
| 1.3-1.6 | 96.0 |
| 1.6-2.2 | 97.5 |
| 2.2-3.0 | 98.8 |
| 3.0-4.0 | 99.6 |
| 4.0-5.5 | 99.8 |
| 5.5-7.0 | 99.9 |
| 7.0-10.0 | 100.0 |

The results in Table 1C show that the average initial submicron efficiency for this filter was 84.4%.

A similar web sample (from Run No. 1-5), prepared using lower temperature air (147° C. rather than 155° C.) at the slot 209 was submitted for analysis with a scanning electron microscope. Using a sample containing 339 meltblown fibers and 51 meltspun fibers, and assuming that all fibers less than 10 µm in size were meltblown fibers, the meltblown fibers were found to have a median size of 0.95 µm and the meltspun fibers were found to have a median size of 15 µm. Essentially 100% of the meltblown fibers were captured within the meltspun stream. The web sample was cross-sectioned and microfibers were found to be distributed through the full thickness of the web.

Figure 14A:
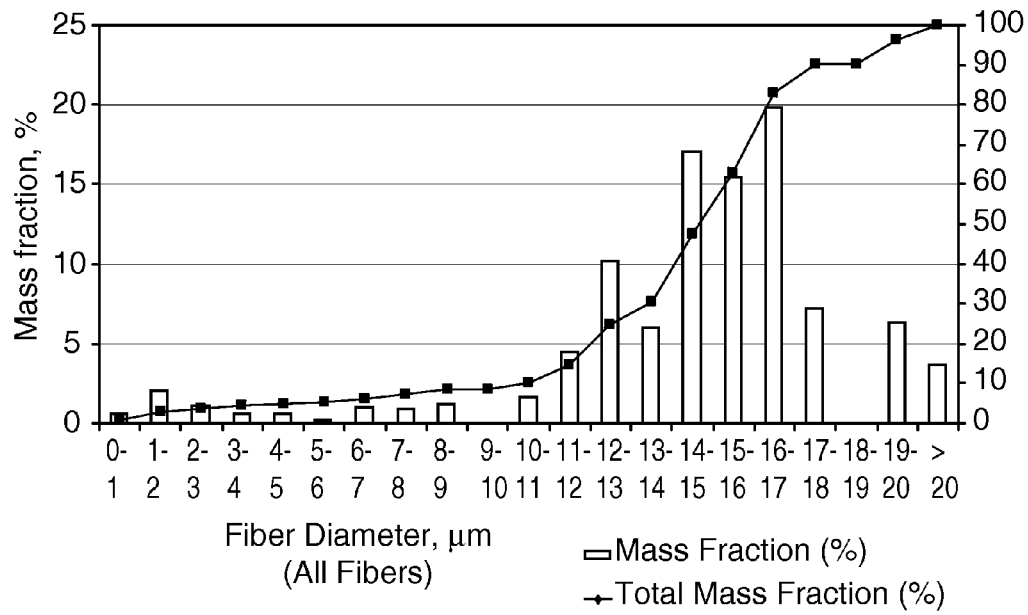
FIG. 14a and FIG. 14b are histograms vs. fiber size in µm for the web of Example 2.
Figure 14B:
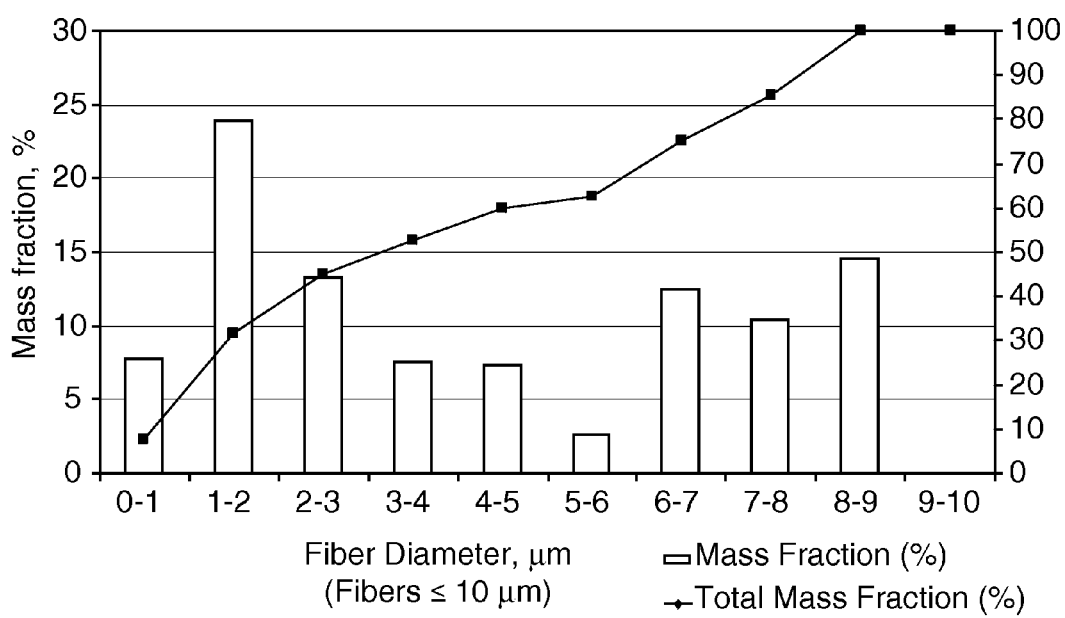

A histogram of mass fraction vs. fiber size in µm is pictured in FIG. 14a, and a further histogram of mass fraction vs. fiber size in µm for fibers with a fiber size less than or equal to 10 µm is pictured in FIG. 14b. The web exhibited modes at 1-2, 8-9 and 16-17 µm. Local peaks also appeared at 6-7, 12-13, 14-15 and 19-20 µm, but did not have larger heights than fiber sizes 2 µm larger (or, in the case of the local peak at 19-20 µm, 2 µm smaller) and did not represent a mode.

EXAMPLE 3

Using a single extruder, a meltblowing die tip having a plurality of larger and smaller orifices like that shown in FIG. 8 and procedures like those described in Wente, Van A. "superfine Thermoplastic Fiber", Industrial and Engineering Chemistry, vol. 48. No. 8, 1956, pp 1342-1346 and Naval Research Laboratory Report 111437, Apr. 15, 1954, a monocomponent monolayer meltblown web was formed from TOTAL™ EOD-12 polypropylene, a 1200 melt flow rate polymer available from Total Petrochemicals to which had been added 1% tristearyl melamine as an electret charging additive. The polymer was fed to Model 20 DAVIS STANDARD™ 2 in. (50.8 mm) single screw extruder from the Davis Standard Division of Crompton & Knowles Corp. The extruder had a 60 in. (152 cm) overall length, and a 30/1 length/diameter ratio. A Zenith 10 cc/rev melt pump metered the flow of polymer to a 10 in. (25.4 cm) wide drilled orifice meltblowing die whose original 0.012 in. (0.3 mm) orifices had been modified by drilling out every 21st orifice to 0.033 in. (0.8 mm), thereby providing a 20:1 ratio of the number of smaller size to larger size holes and a 2.67:1 ratio of larger hole size to smaller hole size. The line of orifices had 25 holes/inch (10 holes/cm) hole spacing. Heated air attenuated the fibers at the die tip. The airknife employed a 0.020 in. (0.51 mm) negative set back and a 0.030 in. (0.76 mm) air gap. No to moderate vacuum was pulled through a medium mesh collector screen at the point of web formation. The polymer output rate from the extruder was 2.0 lbs/in/hr (0.36 kg/cm/hr), the DCD (die-to-collector distance) was 23.0 in. (58.4 cm) and the air pressure was adjusted as needed to provide webs with a basis weight of about 93 gsm and an EFD of about 22 µm. The web was hydrocharged with distilled water according to the technique taught in U.S. Pat. No. 5,496,507 (Angadjivand et al. '507) and allowed to dry, then evaluated to determine the flat web properties shown below in Table 3A. Eight samples were examined and averaged to measure Gurley Stiffness, NaCl penetration and DOP penetration:

TABLE 3A

| Basis weight, gsm | 93 |
|---|---|
| Thickness, mm | 1.2 |
| EFD, µm | 22.4 |
| Gurley Stiffness, mg | 351.3 |
| Pressure Drop at 13.8 cm/sec face velocity (NaCl), mm $H_2O$ | 1.3 |
| NaCl Penetration at 13.8 cm/sec face velocity, % | 21.2 |
| Quality Factor, QF, $mm^{-1}$ $H_2O$ (NaCl) | 1.28 |
| Pressure Drop at 13.8 cm/sec face velocity (DOP), mm $H_2O$ | 1.4 |
| DOP Penetration at 13.8 cm/sec face velocity, % | 35.0 |
| Quality Factor, QF, $mm^{-1}$ $H_2O$ (DOP) | 0.74 |

Using the method of Example 2, the web was formed into a pleated filter element, the pleats were stabilized, the filter was framed with a one-piece chipboard frame and the filter element was tested for initial pressure drop and initial fractional efficiency at a 300 ft/min (1.52 msec) face velocity. The initial pressure drop was 0.245 in. (6.2 mm) $H_2O$. The results for the individual particle size ranges are shown below in Table 3B.

TABLE 3B

| Size Range, µm | Initial Fractional Efficiency, % |
|---|---|
| 0.3-0.4 | 71.5 |
| 0.4-0.55 | 79.9 |
| 0.55-0.7 | 86.0 |
| 0.7-1.0 | 89.9 |
| 1.0-1.3 | 93.0 |
| 1.3-1.6 | 94.6 |
| 1.6-2.2 | 96.1 |
| 2.2-3.0 | 97.1 |
| 3.0-4.0 | 98.4 |
| 4.0-5.5 | 98.9 |
| 5.5-7.0 | 99.5 |
| 7.0-10.0 | 99.9 |

The results in Table 3B show that the average initial submicron efficiency for this filter was 81.8%.

EXAMPLE 4

Using an apparatus like that shown in FIG. 6 and procedures like those described in Wente, Van A. "superfine Thermoplastic Fiber", Industrial and Engineering Chemistry, vol. 48. No. 8, 1956, pp 1342-1346 and Naval Research Laboratory Report 111437, Apr. 15, 1954, a monocomponent monolayer web was formed using meltblowing of larger fibers and separately prepared smaller size fibers of the same polymeric composition. The larger size fibers were formed using TOTAL 3960 polypropylene having a melt flow index of 350 from Total Petrochemicals, to which had been added 0.8% CHIMASSORB 944 hindered amine light stabilizer as an electret charging additive and 1% POLYONE™ No. CC10054018WE blue pigment from PolyOne Corp. to aid in assessing the distribution of larger size fibers in the web. The resulting blue polymer blend was fed to a Model 20 DAVIS STANDARD™ 2 in. (50.8 mm) single screw extruder from the Davis Standard Division of Crompton & Knowles Corp. The extruder had a 60 in. (152 cm) length and a 30/1 length/diameter ratio. The smaller size fibers were formed using EXXON PP3746 polypropylene having a 1475 melt flow index from Exxon Mobil Corporation, to which had been added 0.8% CHIMASSORB 944 hindered amine light stabilizer. This latter polymer was white in color and was fed to a KILLION™ 0.75 in. (19 mm) single screw extruder from the Davis Standard Division of Crompton & Knowles Corp. Using 10 cc/rev ZENITH™ melt pumps from Zenith Pumps, the flow of each polymer was metered to separate die cavities in a 20 in. (50.8 cm) wide drilled orifice meltblowing die employing 0.015 in. (0.38 mm) diameter orifices at a spacing of 25 holes/in. (10 holes/cm) with alternating orifices being fed by each die cavity. Heated air attenuated the fibers at the die tip. The airknife employed a 0.010 in. (0.25 mm) positive set back and a 0.030 in. (0.76 mm) air gap. A moderate vacuum was pulled through a medium mesh collector screen at the point of web formation. The polymer output rate from the extruders was 1.0 lbs/in/hr (0.18 kg/cm/hr), the DCD (die-to-collector distance) was 22.5 in. (57.2 cm) and the collector speed was adjusted as needed to provide webs with a 208 gsm basis weight. A 20 µm target EFD was achieved by changing the extrusion flow rates, extrusion temperatures and pressure of the heated air as needed. By adjusting the polymer rate from each extruder a web with 75% larger size fibers and 25% smaller size fibers was produced. The web was hydrocharged with distilled water according to the technique taught in U.S. Pat. No. 5,496,507 (Angadjivand et al. '507) and allowed to dry. Set out below in Table 4A are the basis weight, thickness, EFD, Gurley Stiffness, initial pressure drop, initial NaCl penetration and Quality Factor QF for the flat web at a 13.8 cm/sec face velocity:

TABLE 4A

| | |
|---|---|
| Basis weight, gsm | 208 |
| Thickness, mm | 4.49 |
| EFD, µm | 20.3 |
| Gurley Stiffness, mg | 889 |
| Pressure Drop at 13.8 cm/sec face velocity (NaCl), mm $H_2O$ | 2.9 |
| Initial NaCl Penetration at 13.8 cm/sec face velocity, % | 4.1 |
| Quality Factor, QF, $mm^{-1}$ $H_2O$ (NaCl) | 1.10 |

Using the general method of Example 2 (but using an 11 mm pleat spacing), the web was formed into a pleated filter element, the pleats were stabilized, the filter was framed with a one-piece chipboard frame and the filter element was tested for initial pressure drop and initial fractional efficiency at a 300 ft/min (1.52 msec) face velocity. The initial pressure drop was 0.831 in. (21.1 mm) $H_2O$. The results for the individual particle size ranges are shown below in Table 4B.

TABLE 4B

| Size Range, µm | Initial Fractional Efficiency, % |
|---|---|
| 0.3-0.4 | 92.0 |
| 0.4-0.55 | 95.6 |
| 0.55-0.7 | 98.1 |
| 0.7-1.0 | 99.1 |
| 1.0-1.3 | 99.6 |
| 1.3-1.6 | 99.7 |
| 1.6-2.2 | 99.8 |
| 2.2-3.0 | 99.9 |
| 3.0-4.0 | 99.9 |
| 4.0-5.5 | 100.0 |
| 5.5-7.0 | 100.0 |
| 7.0-10.0 | 100.0 |

The results in Table 4B show that the average initial submicron efficiency for this filter was 96.2%.

EXAMPLE 5

Using the method of Comparative Example 3 of U.S. Pat. No. 6,319,865 B1 (Mikami), webs were prepared using a 10 in. (25.4 cm) wide drilled orifice die whose tip had been modified to provide a row of larger and smaller sized orifices. The larger orifices had a 0.6 mm diameter (Da), the smaller orifices had a 0.4 mm diameter (Db), the orifice diameter ratio R (Da/Db) was 1.5, there were 5 smaller orifices between each pair of larger orifices and the orifices were spaced at 30 orifices/in. (11.8 orifices/cm). A single screw extruder with a 50 mm diameter screw and a 10 cc melt pump were used to supply the die with 100% TOTAL 3868 polypropylene. The die also had a 0.20 mm air slit width, a 60° nozzle edge angle, and a 0.58 mm air lip opening. A fine mesh screen moving at 1 to 50 m/min was employed to collect the fibers. The other operating parameters are shown below in Table 5A:

TABLE 5A

| Parameter | Value |
|---|---|
| Polymer melt flow rate | 37 MFR |
| Extruder barrel temp | 320° C. |
| Screw speed | 8 rpm |
| Polymer flow rate | 4.55 kg/hr |
| Die temp | 300° C. |
| DCD | 200 mm |
| Die Air temp | 275° C. |
| Die Air rate | 5 $Nm^3$/min |
| Larger Orifice diameter Da | 0.6 mm |
| Smaller Orifice diameter Db | 0.4 mm |
| Orifice Diameter ratio R (Da/Db) | 1.5 |
| Number of smaller orifices per larger orifice | 5 |
| Average Fiber Diameter, µm | 2.44 |
| St Dev Fiber Diameter, µm | 1.59 |
| Min Fiber Diameter, µm | 0.65 |
| Max Fiber Diameter, µm | 10.16 |
| EFD, µm | 9.4 |
| Shot | Many |

Using the above-mentioned operating parameters, a shot-free web was not obtained. Had shot-free web been formed, the observed Effective Fiber Diameter value would likely have been less than the 9.4 µm value reported above. Shot-containing webs were nonetheless prepared at four different basis weights, namely; 60, 100, 150 and 200 gsm, by varying the collector speed.

Figure 15:
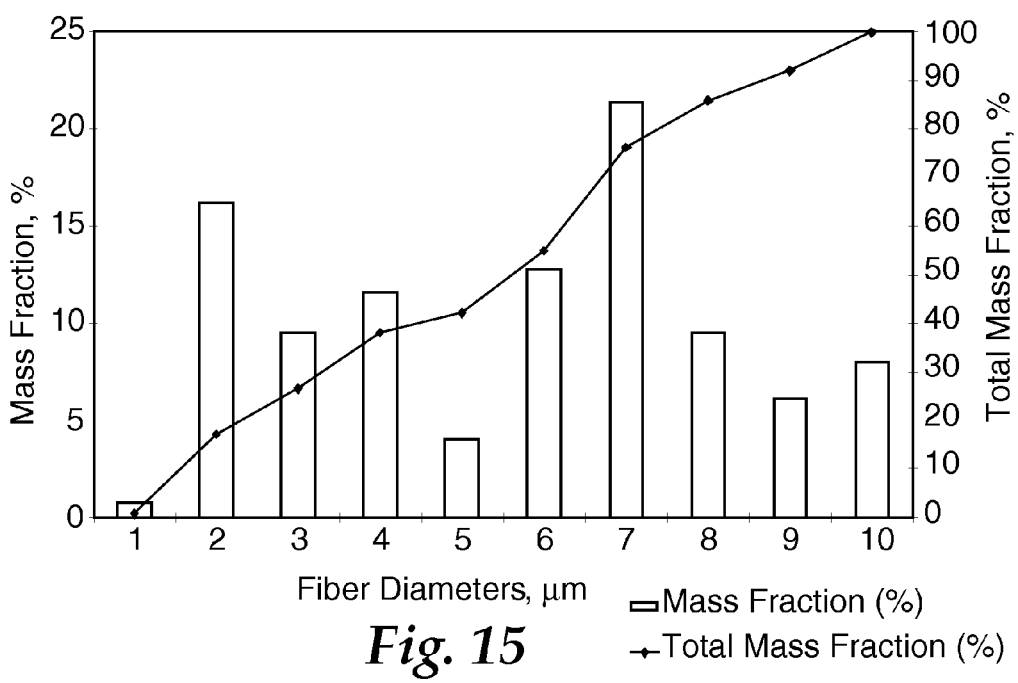
FIG. 15, FIG. 16 and FIG. 18 are histograms of mass fraction vs. fiber size in µm.

FIG. 15 is a histogram of mass fraction vs. fiber size in µm for the 200 gsm web. The web exhibited modes at 2 and 7 µm. Local peaks also appeared at 4 and 10 µm. The 4 µm peak did not have a larger height than fiber sizes 2 μm smaller and 2 μm larger and did not represent a mode, and the 10 μm peak did not have a larger height than fiber sizes 2 μm smaller and did not represent a mode. As shown in FIG. 15, the web did not have a larger size fiber mode greater than 10 μm.

It was determined that shot could be reduced by employing a higher melt flow index polymer and increasing the DCD value. Using 100% TOTAL 3860X 100 melt flow rate polypropylene available from Total Petrochemicals and the operating parameters shown below in Table 5B, webs with substantially reduced shot were formed at 60, 100, 150 and 200 gsm by varying the collector speed. The resulting webs had considerably more fibers with a diameter greater than 10 μm than was the case for the webs produced using the Table 5A operating parameters.

TABLE 5B

| Parameter | Value |
| --- | --- |
| Polymer melt flow rate | 100 MFR |
| Extruder barrel temp | 320° C. |
| Screw speed | 8 rpm |
| Polymer flow rate | 4.55 kg/hr |
| Die temp | 290° C. |
| DCD | 305 mm |
| Die Air temp | 270° C. |
| Die Air rate | 4.4 Nm³/min |
| Larger Orifice diameter Da | 0.6 mm |
| Smaller Orifice diameter Db | 0.4 mm |
| Orifice Diameter ratio R (Da/Db) | 1.5 |
| Number of smaller orifices per larger orifice | 5 |
| Average Fiber Diameter, μm | 3.82 |
| St Dev Fiber Diameter, μm | 2.57 |
| Min Fiber Diameter, μm | 1.33 |
| Max Fiber Diameter, μm | 20.32 |
| EFD, μm | 13.0 |
| Shot | Not Many |

Figure 16:
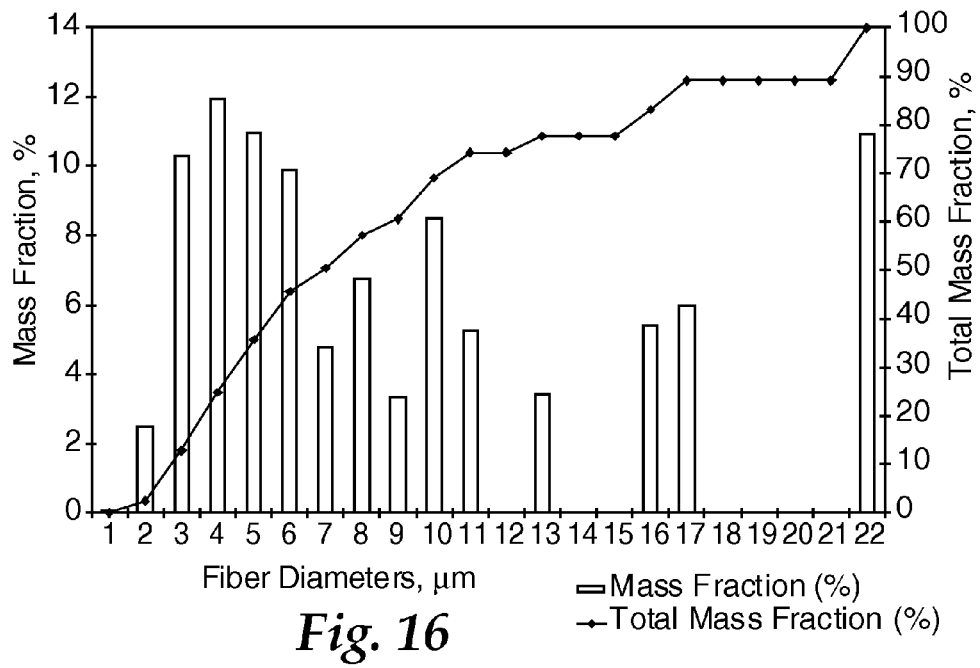
Figure 17:
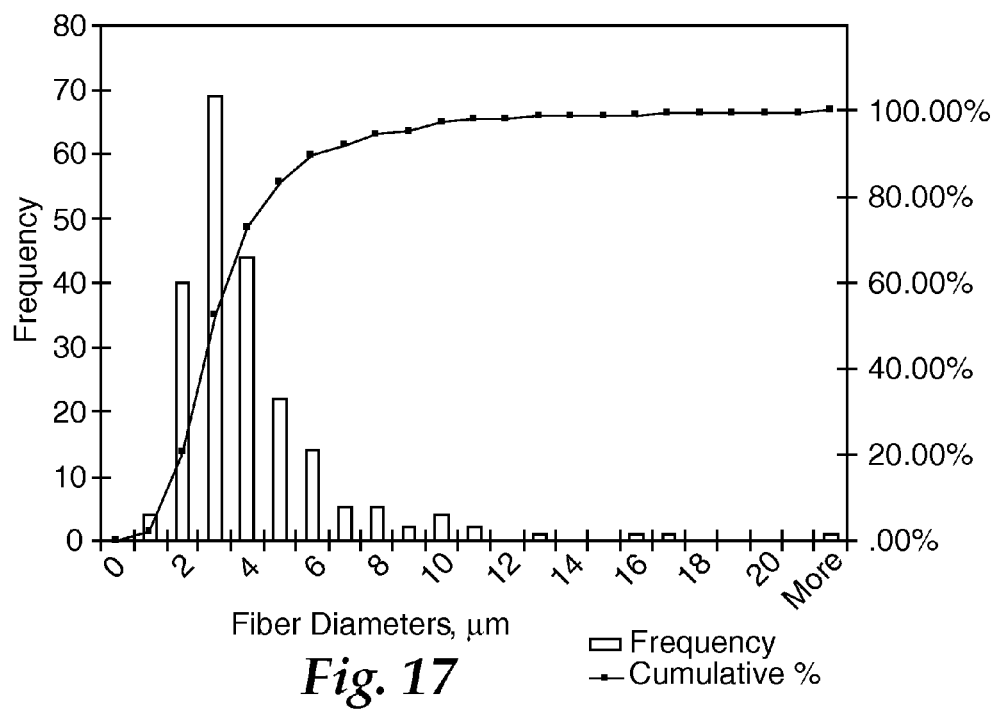
FIG. 17 and FIG. 19 are histograms of fiber count (frequency) vs. fiber size in µm, for a series of webs of Example 5.

FIG. 16 is a histogram of mass fraction vs. fiber size in μm for the 200 gsm web. The web exhibited modes at 4, 10, 17 and 22 μm. Local, non-modal peaks also appeared at 8 and 13 μm. FIG. 17 is a histogram of fiber count (frequency) vs. fiber size in μm for the same 200 gsm web.

It was also determined that shot could be reduced by employing a die with a greater number of smaller orifices per larger orifice than the Mikami et al. dies. Webs with minimal shot were also produced at 60, 100, 150 and 200 gsm using both TOTAL 3868 and TOTAL 3860X polymers and a different 10 in. (25.4 cm) wide drilled orifice die. The die tip for this latter die had been modified to provide a row of larger and smaller sized orifices with a greater number of smaller orifices between larger orifices than disclosed in Mikami et al. The larger orifices had a 0.63 mm diameter (Da), the smaller orifices had a 0.3 mm diameter (Db), the orifice diameter ratio R (Da/Db) was 2.1, there were 9 smaller orifices between each pair of larger orifices and the orifices were spaced at 25 orifices/in. (9.8 orifices/cm). A single screw extruder with a 50 mm diameter screw and a 10 cc melt pump were used to supply the die with polymer. The die also had a 0.76 mm air slit width, a 60° nozzle edge angle, and a 0.86 mm air lip opening. A fine mesh screen moving at 1 to 50 m/min and the operating parameters shown below in Table 5C were employed to collect webs at 60, 100, 150 and 200 gsm:

TABLE 5C

| Parameter | Value | |
| --- | --- | --- |
| Polymer melt flow rate | 37 MFR | 100 MFR |
| Extruder barrel temp | 320° C. | 320° C. |
| Screw speed | 9 rpm | 10 rpm |

TABLE 5C-continued

| Parameter | Value | |
| --- | --- | --- |
| Polymer flow rate | 4.8 kg/hr | 4.8 kg/hr |
| Die temp | 295° C. | 290° C. |
| DCD | 395 mm | 420 mm |
| Die Air temp | 278° C. | 274° C. |
| Die Air rate | 4.8 Nm³/min | 4.8 Nm³/min |
| Larger Orifice diameter Da | 0.63 mm | 0.63 mm |
| Smaller Orifice diameter Db | 0.3 mm | 0.3 mm |
| Orifice Diameter ratio R (Da/Db) | 2.1 | 2.1 |
| Number of smaller orifices per larger orifice | 9 | 9 |
| Average Fiber Diameter, μm | 2.31 | 2.11 |
| St Dev Fiber Diameter, μm | 4.05 | 3.12 |
| Min Fiber Diameter, μm | 0.17 | 0.25 |
| Max Fiber Diameter, μm | 23.28 | 23.99 |
| EFD, μm | 10.4 | 11.2 |
| Shot | Not Many | Not Many |

Figure 18:
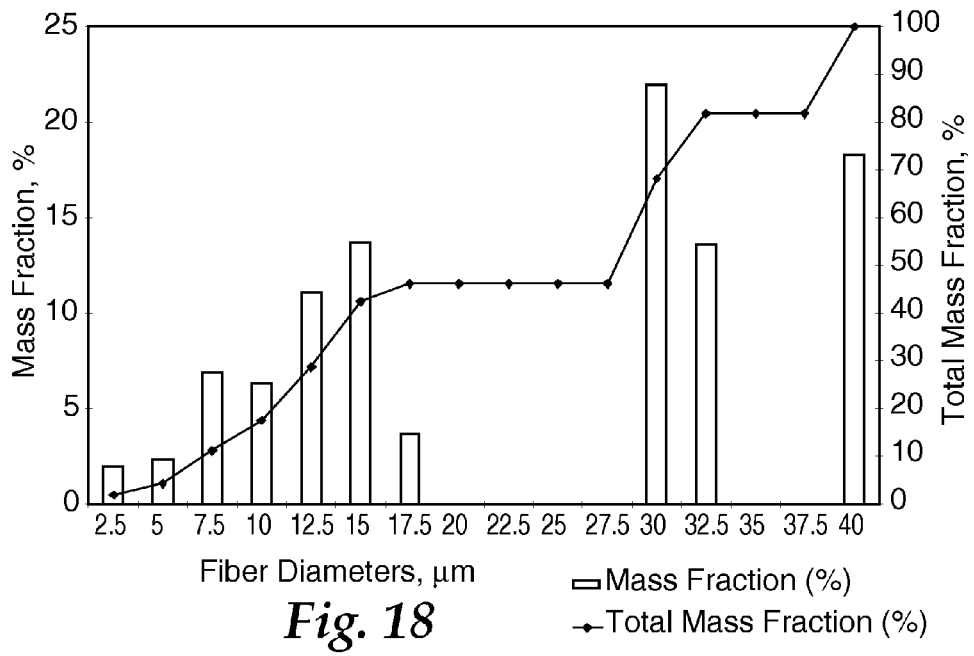
Figure 19:
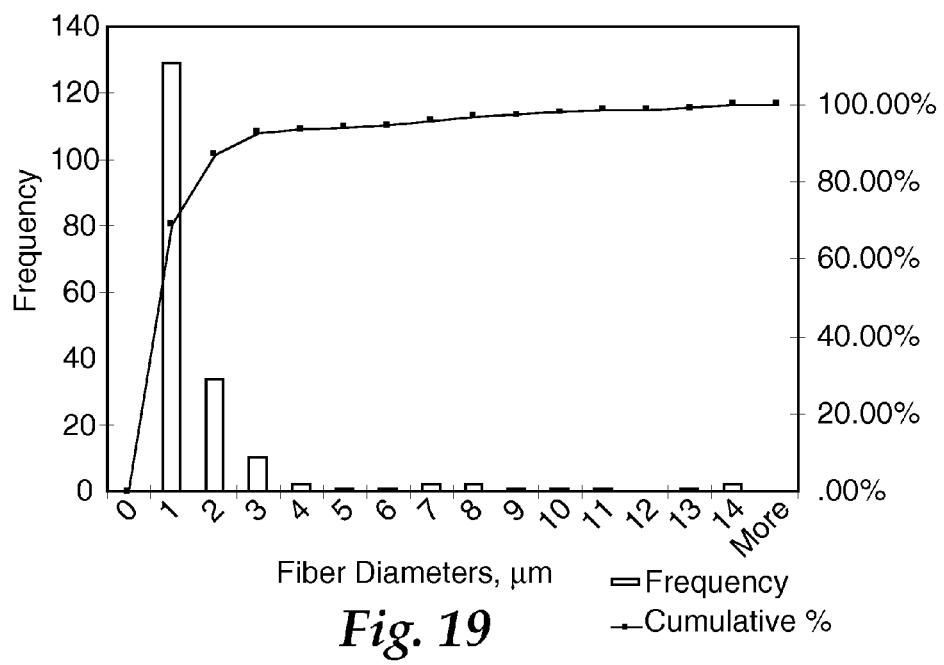

FIG. 18 is a histogram of mass fraction vs. fiber size in μm for the 200 gsm 100 MFR web. The web exhibited modes at 15, 30 and 40 μm. FIG. 19 is a histogram of fiber count (frequency) vs. fiber size in μm for the same 200 gsm web.

A number of embodiments of the invention have been described. Nevertheless, it will be understood that various modifications may be made without departing from the invention. Accordingly, other embodiments are within the scope of the following claims.

We claim:

1. A pleated filter comprising a self-supporting porous monocomponent monolayer matrix containing a bimodal mass fraction/fiber size mixture of intermingled larger size and smaller size continuous monocomponent polymeric fibers of the same polymeric composition, the fibers being bonded to one another at at least some points of fiber intersection and the matrix forming rows of folded or corrugated pleats and having an average initial submicron efficiency of at least 15% at a 1.52 meters/sec face velocity and wherein the histogram of mass fraction vs. fiber size in μm exhibits a larger size fiber mode of about 10 to about 40 μm; wherein the monolayer matrix comprises a generally uniform distribution of fiber sizes throughout a cross-section of the monolayer matrix, and wherein the larger and smaller size fibers are meltblown fibers.

2. A pleated filter according to claim 1 wherein the histogram of mass fraction vs. fiber size in μm exhibits a smaller size fiber mode of about 1 to about 5 μm and a larger size fiber mode of about 12 to about 30 μm.

3. A pleated filter according to claim 1 wherein a histogram of fiber count (frequency) vs. fiber size in μm exhibits at least two modes whose corresponding fiber sizes differ by at least 50% of the smaller fiber size.

4. A pleated filter according to claim 1 wherein the larger size fibers have a size of about 10 to about 40 μm and the smaller size fibers have a size of about 0.5 to about 20 μm.

5. A pleated filter according to claim 1 wherein the larger size fibers have a size of about 20 to about 40 μm and the smaller size fibers have a size of about 0.5 to about 10 μm.

6. A pleated filter according to claim 1 wherein the ratio of the number of smaller size fibers per larger size fiber is 6:1 or more.

7. A pleated filter according to claim 1 wherein the smaller size fibers provide at least 20% of the fibrous surface area of the matrix.

8. A pleated filter according to claim 1 wherein the smaller size fibers provide at least 40% of the fibrous surface area of the matrix.

9. A pleated filter according to claim 1 wherein the matrix has a basis weight of about 65 to about 250 gsm.

10. A pleated filter according to claim 1 wherein the polymer is polypropylene.

11. A pleated filter according to claim 1 wherein the porous monocomponent monolayer matrix is charged.

12. A pleated filter according to claim 1 wherein the intermingled larger size and smaller size continuous monocomponent polymeric fibers of the same polymeric composition are collected as a bimodal mass fraction/fiber size merged stream of larger and smaller size fibers.

* * * * *

UNITED STATES PATENT AND TRADEMARK OFFICE
CERTIFICATE OF CORRECTION

| | |
|---|---|
| PATENT NO. | : 8,372,175 B2 |
| APPLICATION NO. | : 12/789053 |
| DATED | : February 12, 2013 |
| INVENTOR(S) | : Andrew R Fox |

It is certified that error appears in the above-identified patent and that said Letters Patent is hereby corrected as shown below:

Title Page, Column 2 (Abstract)
Line 9, Delete "at least" and insert -- at at least --.

Column 1
Line 19, Delete "4,100,324" and insert -- U.S. Pat. No. 4,100,324 --, therefor.

Column 2
Line 42, Delete "at least" and insert -- at at least --, therefor.
Line 50, Delete "at least" and insert -- at at least --, therefor.

Column 7
Line 27, Delete "11/457,906 ," and insert -- 11/457,906 (Attorney Docket No. 60928US002), --, therefor.

Column 8
Line 27, Delete "calendars," and insert -- calenders, --, therefor.

Column 9
Line 37, Delete "calendar" and insert -- calender --, therefor.
Line 41, Delete "11/457,899 ," and insert -- 11/457,899 (Attorney Docket No. 60632US002), --, therefor.

Column 14
Line 45, Delete "11/461,136 ," and insert -- 11/461,136 (Attorney Docket No. 61726US003), --, therefor.

Column 16
Lines 57-58, Delete "at least" and insert -- at at least --, therefor.

Signed and Sealed this
Fourteenth Day of May, 2013

Teresa Stanek Rea
*Acting Director of the United States Patent and Trademark Office*

CERTIFICATE OF CORRECTION (continued)
U.S. Pat. No. 8,372,175 B2

Column 18
Line 62, Delete "msec)" and insert -- m/sec) --, therefor.

Column 23
Line 8, Delete "msec)" and insert -- m/sec) --, therefor.

Column 24
Line 40, Delete "msec)" and insert -- m/sec) --, therefor.

Column 25
Line 65, Delete "msec)" and insert -- m/sec) --, therefor.